US008649068B2

(12) United States Patent
Herloski et al.

(10) Patent No.: US 8,649,068 B2
(45) Date of Patent: Feb. 11, 2014

(54) PROCESS FOR CREATING FACET-SPECIFIC ELECTRONIC BANDING COMPENSATION PROFILES FOR RASTER OUTPUT SCANNERS

(75) Inventors: Robert Herloski, Webster, NY (US); Edward W. Smith, Jr., Wolcott, NY (US); Howard Mizes, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 186 days.

(21) Appl. No.: 13/334,251

(22) Filed: Dec. 22, 2011

(65) Prior Publication Data

US 2013/0163055 A1 Jun. 27, 2013

(51) Int. Cl.

| | |
|---|---|
| ***H04N 1/00*** | (2006.01) |
| *G06F 15/00* | (2006.01) |
| *G06K 1/00* | (2006.01) |

(52) U.S. Cl.
USPC ............................................ 358/406; 358/1.1

(58) Field of Classification Search
None
See application file for complete search history.

(56) References Cited

U.S. PATENT DOCUMENTS

| | | | | |
|---|---|---|---|---|
| 5,248,997 | A | 9/1993 | Summers | |
| 5,519,514 | A | 5/1996 | TeWinkle | |
| 5,550,653 | A | 8/1996 | TeWinkle et al. | |
| 5,680,541 | A | 10/1997 | Kurosu et al. | |
| 5,900,901 | A | 5/1999 | Costanza et al. | |
| 6,307,584 | B1 | 10/2001 | Hirst et al. | |
| 6,342,963 | B1 | 1/2002 | Yoshino | |
| 6,462,821 | B1 | 10/2002 | Borton et al. | |
| 6,567,170 | B2 | 5/2003 | Tandon et al. | |
| 6,621,576 | B2 | 9/2003 | Tandon et al. | |
| 6,636,253 | B2 | 10/2003 | Nishiguchi et al. | |
| 6,760,056 | B2 | 7/2004 | Klassen et al. | |
| 6,975,949 | B2 | 12/2005 | Mestha et al. | |
| 7,024,152 | B2 | 4/2006 | Lofthus et al. | |
| 7,058,325 | B2 | 6/2006 | Hamby et al. | |
| 7,120,369 | B2 | 10/2006 | Hamby et al. | |
| 7,136,616 | B2 | 11/2006 | Mandel et al. | |
| 7,177,585 | B2 | 2/2007 | Matsuzaka et al. | |
| 7,391,542 | B2 * | 6/2008 | Tanimura et al. | 358/481 |
| 7,492,381 | B2 | 2/2009 | Mizes et al. | |
| 7,564,475 | B1 | 7/2009 | Mizes | |
| 7,855,806 | B2 | 12/2010 | Paul et al. | |
| 7,911,652 | B2 | 3/2011 | Goodman et al. | |
| 7,965,397 | B2 | 6/2011 | Paul | |
| 2004/0036705 | A1 | 2/2004 | Jung et al. | |
| 2004/0135878 | A1 | 7/2004 | Mizes et al. | |
| 2004/0179090 | A1 | 9/2004 | Klassen et al. | |
| 2005/0099446 | A1 | 5/2005 | Mizes et al. | |
| 2005/0134623 | A1 | 6/2005 | Mizes | |
| 2005/0134624 | A1 | 6/2005 | Mizes | |
| 2007/0052991 | A1 | 3/2007 | Goodman et al. | |
| 2007/0139509 | A1 | 6/2007 | Mizes et al. | |
| 2007/0236747 | A1 | 10/2007 | Paul et al. | |
| 2009/0002724 | A1 | 1/2009 | Paul et al. | |
| 2011/0058184 | A1 | 3/2011 | Ramesh et al. | |
| 2011/0058186 | A1 | 3/2011 | Ramesh et al. | |
| 2011/0058226 | A1 | 3/2011 | Ramesh et al. | |
| 2011/0228030 | A1 | 9/2011 | Maeda | |
| 2011/0298883 | A1 | 12/2011 | Ohyama | |

* cited by examiner

*Primary Examiner* — Douglas Tran
(74) *Attorney, Agent, or Firm* — Fay Sharpe LLP

(57) ABSTRACT

Processes are presented for creating electronic banding compensation profiles for raster output scanner (ROS) devices by printing and scanning a test pattern having a series of strips extending along a process direction and spaced from one another along a cross process (fast scan) direction, analyzing the scanned data to determine facet-specific banding errors corresponding to individual strips, and selectively adjusting banding correction profiles to counteract the banding errors.

21 Claims, 11 Drawing Sheets

PROCESS FOR CREATING FACET-SPECIFIC ELECTRONIC BANDING COMPENSATION PROFILES FOR RASTER OUTPUT SCANNERS

REFERENCE TO RELATED APPLICATIONS AND INCORPORATION BY REFERENCE

This application is related to U.S. patent application Ser. No. 13/313,533, filed Dec. 7, 2011 and entitled "PRINTING SYSTEM, RASTER OUTPUT SCANNER, AND METHOD WITH ELECTRONIC BANDING COMPENSATION USING FACET-DEPENDENT SMILE CORRECTION", the entirety of which is hereby incorporated by reference as if fully set forth herein. The following documents are incorporated by reference in their entireties: U.S. Pat. App. Publication No. 2011/0058186 to Ramesh et al., filed Sep. 8, 2009, Least Squares Based Coherent Multipage Analysis of Printer Banding for Diagnostics and Compensation; U.S. Pat. App. Publication No. 2011/0058226 to Ramesh et al., filed Sep. 8, 2009, Banding Profile Estimation using Spline Interpolation; U.S. Pat. App. Publication No. 2011/0058184 to Ramesh et al., filed Sep. 8, 2009, Least Squares Based Exposure Modulation for Banding Compensation; U.S. Pat. App. Publication No. 2007/0052991 to Goodman et al., filed Sep. 8, 2005, Methods and Systems for Determining Banding Compensation Parameters in Printing Systems; U.S. Pat. App. Publication No. 2009/0002724 to Paul et al., filed Jun. 27, 2007, Banding Profile Estimator using Multiple Sampling Intervals; U.S. Pat. App. Publication No. 2007/0139509 to Mizes et al., filed Dec. 21, 2005, Compensation of MPA Polygon Once Around with Exposure Modulation; U.S. Pat. App. Publication No. 2007/0236747 to Paul et al., filed Apr. 6, 2006, Systems and Methods to Measure Banding Print Defects; U.S. Pat. No. 7,120,369 to Hamby et al.; U.S. Pat. No. 7,058,325 to Hamby et al; U.S. Pat. No. 5,519,514 to TeWinkle; U.S. Pat. No. 5,550,653 to TeWinkle et al.; U.S. Pat. No. 5,680,541 to Kurosu et al.; U.S. Pat. No. 6,621,576 to Tandon et al.; U.S. Pat. No. 6,432,963 to Yoshino; U.S. Pat. No. 6,462,821 to Borton et al.; U.S. Pat. No. 6,567,170 to Tandon et al., U.S. Pat. No. 6,975,949 to Mestha et al.; U.S. Pat. No. 7,024,152 to Lofthus et al.; U.S. Pat. No. 7,136,616 to Mandel et al.; U.S. Pat. No. 7,177,585 to Matsuzaka et al.; and U.S. Pat. No. 7,492,381 to Mizes et al.

BACKGROUND

The present exemplary embodiments relate to printing systems with raster output scanner (ROS) apparatus and to techniques for mitigating banding errors. Reprographic printing systems are used to create marked images on paper or other remarkable media, and improving the quality of the produced images is a continuing goal. Final image quality is affected by various sources of noise and errors in a reprographic system, leading to density variations in the marking material fused to the final print medium. In the reprographic process, a photoreceptor travels along a process direction, and images and text are formed as individual scan lines or groups of scan lines (sometimes referred to as a swath) in a raster scanning process in a cross-process direction, where the process direction motion is much slower than the raster scanning in the cross-process direction. Accordingly, the cross-process scanning direction is sometimes referred to as a "fast scan" direction, and the process direction is referred to as a "slow scan" direction.

Certain sources of reprographic system noise and errors caused periodic density variations in the process direction, which are sometimes referred to as "banding" errors. Periodic density variations may be characterized by the amplitude and phase of a fundamental frequency, as well as harmonics of this frequency. Various sources of banding exist in a marking (or print) engine. For example, raster output scanners employ rotating polygon mirror apparatus driven by a motor, known as a motor polygon assembly or MPA, with one or more light sources being scanned by rotation of the MPA such that scan lines are generated in the fast scan (cross-process) direction through reflection off a reflective facet of the rotating polygon mirror apparatus.

Differences in reflectivity, shape, profile, orientation, etc. in different reflective facets of the polygon lead to differences in image density (color intensity) in the final print out which are a function of which polygon facet was used to create a given scan line or swath of scan lines. As a result, the final print image may include bands of variations from the desired density that are periodic in the process direction. Other sources of banding errors include gears, pinions, and rollers in charging and development modules; jitter and wobble in imaging modules, as well as photoreceptors and associated drive trains. Banding usually manifests itself as periodic density variations in halftones in the process direction. The period of these defects is related to the once around frequency of the banding source. If not addressed, such periodic process direction density variations can render a reprographic printing system unacceptable, particularly where the banding errors are visually perceptible.

Banding can be addressed through reductions in the sources of such noise or errors and/or by compensation in various reprographic system components in order to counteract its affects, typically by injecting a known error that offsets the banding resulting from the sources of such periodic density variations. There are many various errors that produce banding at the 1× (and multiples) of the revolution frequency of the MPA (motor polygon assembly) in reprographic systems using a raster output scanner. In practice, it is difficult to completely eliminate the error sources that contribute to MPA harmonic banding, or even to reduce them enough to avoid perceptible periodic density variations. In addition, customer requirements are continually reducing the amount banding that is deemed to be acceptable. Consequently, banding compensation techniques have become an important tool in meeting reprographic system performance specifications. For instance, ROS exposure power can be varied in a controlled fashion to compensate for banding, and conventional banding compensation techniques include measurement of banding (including from multiple sources) and the use of that information to actuate some correction strategy on a scanline by scanline basis (including ROS exposure variation) to combat banding. However, conventional banding compensation approaches do not address cross-process (fast scan) direction density variation in banding, and instead average test prints in the cross-process direction to get a one-dimensional banding profile which is then used to derive the banding compensation independent of cross-process banding density variation information. Accordingly, there is a need for improved techniques for addressing banding errors in document processing devices and other systems using raster output scanners.

BRIEF DESCRIPTION

The present disclosure relates to creation of electronic banding compensation profiles for counteracting banding by cross-process (fast scan) direction light source intensity adjustment corresponding to particular reflective facets of a rotating polygon of a raster output scanner. The various concepts disclosed herein can be used in association with reprographic systems such as printers, multifunction devices, and other forms of document processing devices, etc.

In accordance with one or more aspects of the present disclosure, methods are presented for generating electronic banding compensation profiles, in which a banding compensation test pattern is created on a test page or on a photoreceptor according to a digital test pattern using a raster output scanner (ROS) with a rotating polygon having multiple reflective facets and a series of facet-specific banding compensation profiles for selective adjustment of the light output of the ROS light source(s). The test pattern includes a plurality of strips extending along a process direction which are spaced from one another along the fast scan direction, where one or more of the strips includes fiducial markings spaced from one another along the process direction for identifying particular scanlines in the digital test pattern and/or to correlate the digital test pattern to a scanned test pattern. The test pattern is scanned to create image data which is analyzed to determine facet-specific banding errors corresponding to individual strips. One or more of the facet-specific banding correction profiles are then selectively adjusted to at least partially counteract the banding errors.

In certain embodiments, the method further includes performing a spatial calibration prior to creation of the banding compensation test pattern in order to correlate indices of a table of the banding correction profiles to locations on the test page or photoreceptor. In certain implementations, the spatial calibration includes creating a spatial calibration test pattern using facet-specific spatial calibration profiles to alternatively increase and then decrease light source intensity for consecutive reflective facets or groups thereof to introduce a known banding signature. The spatial calibration test pattern is scanned and a banding magnitude is calculated as a function of position along the fast scan direction. A position in the fast scan direction is calculated for a banding transition midpoint of each of a plurality of transition regions in the banding magnitude relative to an edge of the test page for an edge of the photoreceptor. Positions of left and right edges of each strip of the spatial calibration test pattern are calculated and the positions of the banding transition midpoints are correlated to indices in a smile correction table. In addition, the indices in the smile correction table are correlated to the strips in the test page or photoreceptor.

In certain embodiments, the method includes performing an intensity calibration to correlate changes in light source intensity with changes in print density. The intensity calibration may include creating an intensity calibration test pattern using facet-specific intensity calibration profiles, where a first group of these profiles is set at a nominal light source intensity level and a second group is set at a different intensity level. The test pattern is scanned to create image data and an intensity sensitivity value is calculated according to a ratio of a difference between a density of half swaths written at the nominal light source intensity level and a density of half swaths written at the different light source intensity level to the difference between the light source intensity levels.

In certain embodiments, the ROS includes multiple light sources and each reflective facet concurrently scans a swath including a plurality of scan lines, where the ROS overwrites at least a portion of a previous swath scanned using one reflective facet with a subsequent swath using a different reflective facet, and the fiducial markings identify a particular set of scanlines in the process direction which can be correlated with a pair of overridden swaths corresponding to two reflective facets. In certain embodiments, moreover, a phase calibration is performed to correlate the relative phase difference between the applied facet-specific banding correction profiles and and the resultant density variation in the intensity calibration test pattern image data before the banding compensation procedure is performed.

Further aspects of the disclosure relate to a document processing system including one or more marking stations, at least one sensor or scanner, and one or more processors. The marking station is operative to create a banding compensation test pattern on a test page or on a photoreceptor according to a digital test pattern using a ROS with a rotating polygon having a plurality of reflective facets and at least one light source that is intensity controlled while scanning using a given facet according to a corresponding one of a plurality of facet-specific banding correction profiles. The test pattern includes a plurality of strips individually extending along a process direction and spaced from one another along a fast scan direction, where one or more of the strips includes fiducial markings spaced from one another in the process direction to identify particular scanlines in the digital test pattern. The sensor scans the banding compensation test pattern to create banding compensation test pattern image data, and the processor analyzes the test pattern image data to determine facet-specific banding errors corresponding to individual strips. The processor is further operative to selectively adjust at least one of the facet-specific banding correction profiles in order to counteract the facet-specific banding errors.

In certain embodiments, the processor performs a spatial calibration to correlate indices of a table of the correction profiles to locations on the test page or the photoreceptor in the fast scan direction. In some embodiments, moreover, the processor performs an intensity calibration to correlate changes in intensity of the light source with changes in print density. In certain embodiments, the processor performs a phase calibration to correlate a relative phase difference between an applied facet-specific banding correction profiles and the resultant density variation in the intensity calibration test pattern image data. In addition, the reflective facets in certain embodiments concurrently scan a swath including two or more scan lines, and the ROS overwrites at least a portion of a previous swath with a subsequent swath using a different reflective facet, where the fiducial markings identify a particular pair of overridden swaths corresponding to two reflective facets of the ROS.

In accordance with further aspects of the disclosure, a computer readable medium is provided with computer executable instructions for performing the electronic banding compensation profile generation methods.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
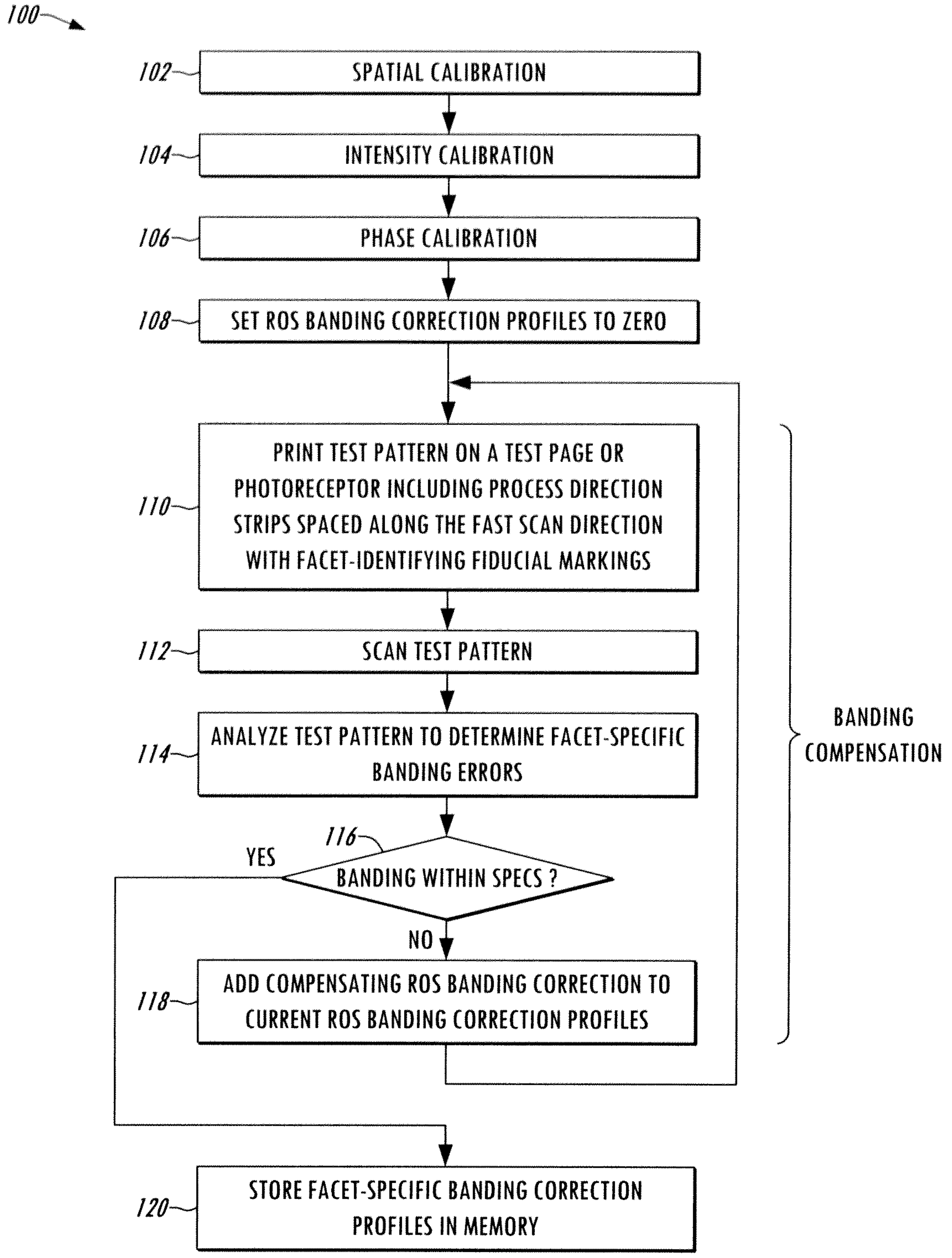
FIG. 1 is a flow diagram illustrating an exemplary method for generating a plurality of banding correction profiles corresponding to reflective facets of a rotating polygon of a raster output scanner (ROS) in accordance with one or more aspects of the present disclosure.

Several embodiments or implementations of the different aspects of the present disclosure are hereinafter described in conjunction with the drawings, wherein like reference numerals are used to refer to like elements throughout, and wherein the various features, structures, and graphical renderings are not necessarily drawn to scale.

The disclosure relates to document processing systems generally and to techniques and apparatus for addressing banding errors through use of electronic banding compensation profiles to alter the light intensity output of one or more ROS light sources for electronic banding compensation. U.S. patent application Ser. No. 13/313,533, filed Dec. 7, 2011 illustrates and describes ROS apparatus and document processing systems, as well as techniques for performing electronic banding compensation in operation, and the entirety of that application is incorporated herein by reference. The concepts of the present disclosure provide techniques for generating electronic banding compensation profiles which may be used in the apparatus and methods described in U.S. patent application Ser. No. 13/313,533 or in other document processing systems.

As illustrated and described below in FIGS. 12-15, advanced document processing systems 400 include raster output scanner (ROS) apparatus 500 which creates a latent image by sweeping or scanning a swath including multiple laser spots across a photoreceptor 404. This beam scanning is accomplished by a rotating polygon mirror 528 that includes a plurality of reflective facets 526. If the polygon 528 rotates smoothly and the facets 526 are all aligned, not distorted, and have the same reflectivity, the swath of beams will be equally spaced, sized, and have the same exposure scan line-to-scan line on the photoreceptor 404. However, if the polygon rotation is not smooth, the facets 526 are distorted, and/or have different reflectivities, the swaths will not be equally spaced nor have the same exposure as they sweep across the photoreceptor 404, causing a density variation of the developed toner on the photoreceptor 404 leading to high spatial frequency banding. The inventors have appreciated that a spatial and facet-specific exposure profile 506 can interfere and cancel out the intrinsic banding for electronic banding compensation. However, conventional techniques for determining the profiles are ad hoc and require printing a series of targets until a good yet likely not the best compensation can be determined.

The present disclosure proposes to instead print and scan a banding compensation test pattern (e.g., pattern 210 in FIGS. 2 and 3 below) that includes a series of strips 212 marked with fiducials 214. The measured strip density profile can be transformed into a swath dependent density using the fiducials 214 as markers for correlation with individual beams 522 of the ROS which create the test pattern from the digital image. The intensity calibration analysis 350 can be used to relate the individual beams 522 of the ROS which create the test pattern to individual facets 526 of the MPA that write the swaths. The indexed facet 526 can be identified in certain implementations by forcing the page printing the calibration test pattern 200 to always start on the same facet 526. Alternatively, one of the strips 212 can act as a tag strip where a known signature is inserted into the correction profile 506. The fundamental frequency and harmonics of the swath density profiles are calculated, and a frequency dependent phase shift can be used for swath overwriting applications to transform the swath density profiles to banding correction profiles 506. A spatial calibration target is used to correlate a smile correction table storing banding correction profiles 506 to a test pattern strip location in the fast scan direction FS. A new banding compensation test pattern is printed using the corrected profile, and the procedure is iterated until banding is eliminated.

FIG. 1 illustrates an exemplary method 100 for generating facet-specific banding correction profiles 506, which includes spatial, intensity and phase calibrations at 102, 104 and 106, respectively, which are described in further detail below. At 108 in FIG. 1, banding correction profiles 506 are set to zero or some other set of initial values in a smile correction table (not shown) of the ROS 500, and thereafter an iterative banding compensation process is performed at 110-118. At 120, a finished set of facet-specific banding correction profiles 506 are stored in an electronic memory for use by the ROS 500, such as in a document processing system controller (e.g. controller 422 in FIG. 12) or in an electronic memory of the ROS 500 (e.g., FIGS. 13-15 below).

Figure 2:
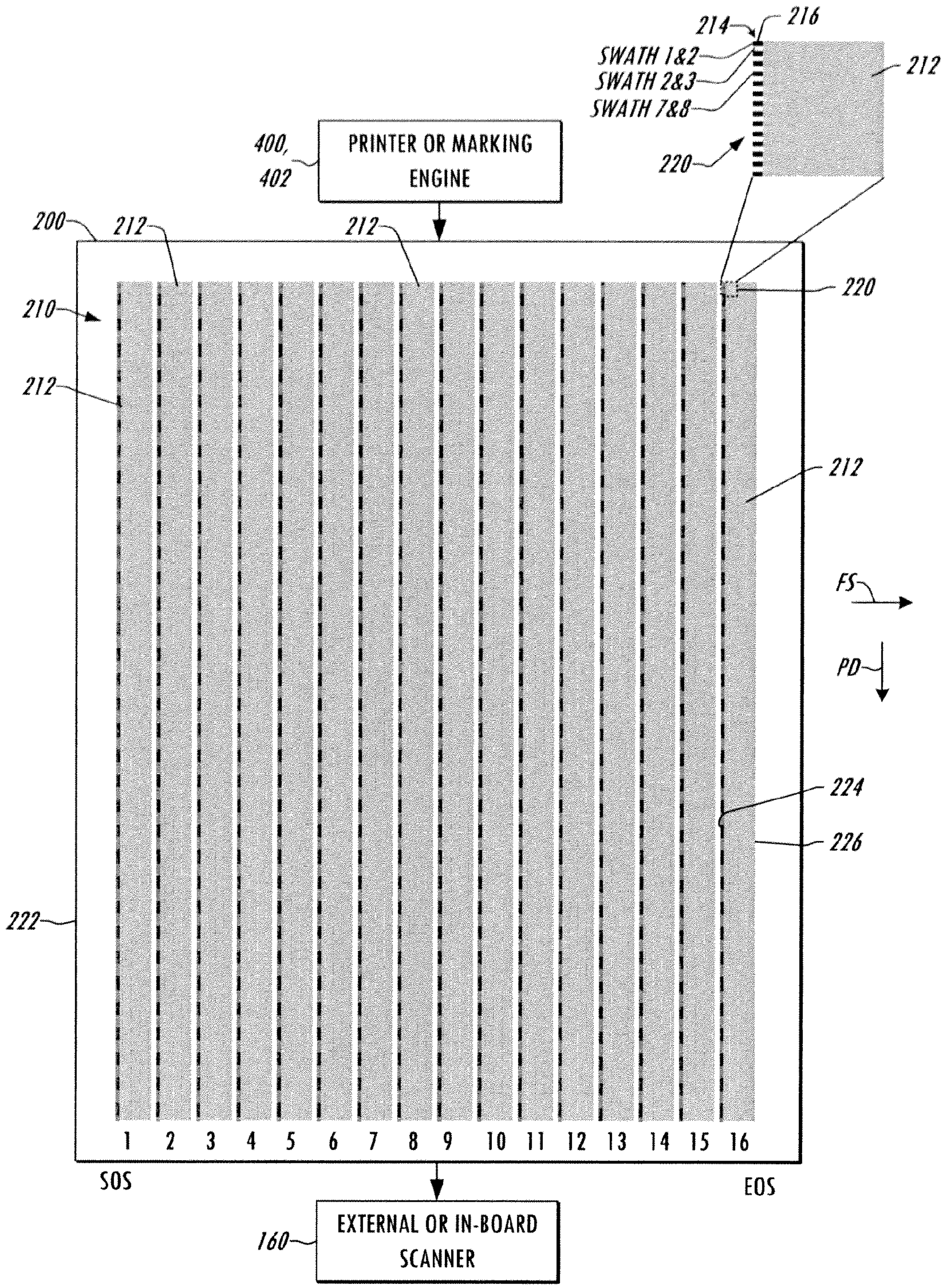
FIG. 2 is a schematic diagram illustrating a test print created by a printer or marking engine including an electronic banding compensation test pattern with a plurality of strips extending along a process direction including a set of fiducials along one edge of the strips.
Figure 12:
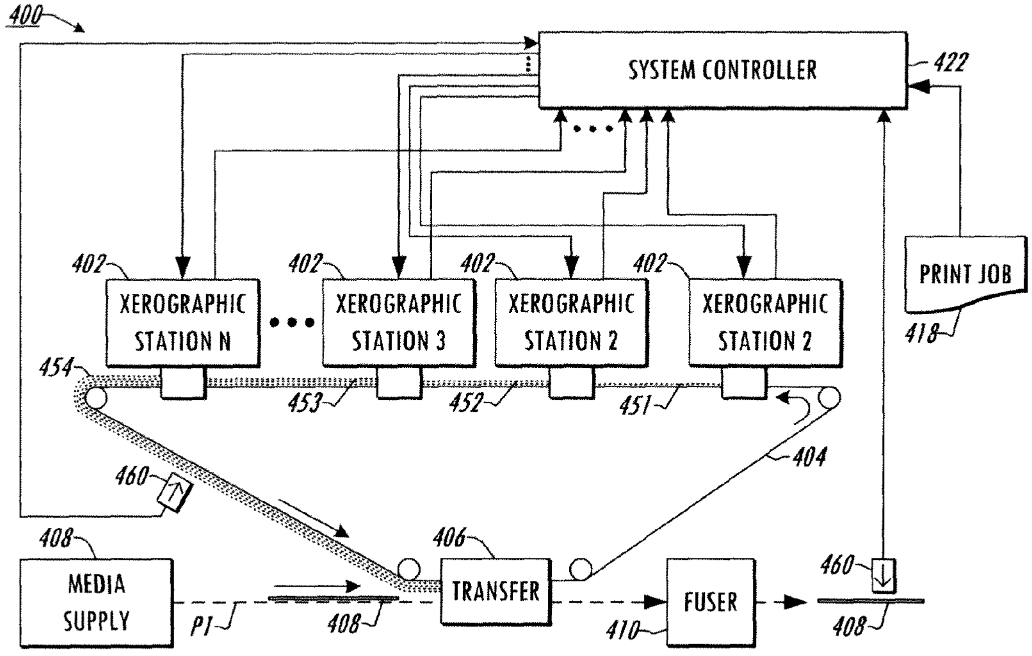
FIG. 12 is a simplified schematic system level diagram illustrating an exemplary multi-color document processing system in which the marking devices individually include ROSs operable using the electronic banding compensation profiles provided by the process of FIG. 1.

Referring now to FIGS. 1 and 2, a banding compensation test pattern (pattern 210 in FIG. 2) is created at 110 in FIG. 1 on a test page (test page 200 in FIG. 2) or on a photoreceptor (e.g., photoreceptor 404 in FIG. 12 or photoreceptor 504 in FIGS. 13-15 below), where the banding compensation test pattern 210 is created using a printer (printer 400 in FIG. 12) or a marking station (marking station 402 in FIG. 12). The banding compensation test pattern 210, moreover, is created via a ROS (ROS 500 in FIGS. 13-15) having a rotating polygon 528 with a plurality of reflective facets 526 and one or more light sources 514 which direct light toward the rotating polygon 528. The intensity of the output of the light source(s) 514, moreover, is controlled during scanning using a given one of the facets 526 according to a corresponding facet-specific banding correction profile 506, where the ROS 500 in certain embodiments stores a banding correction profile 506 in a table, referred to herein as a smile correction table for each reflective facet 526 of the rotating polygon 528.

Figure 3:
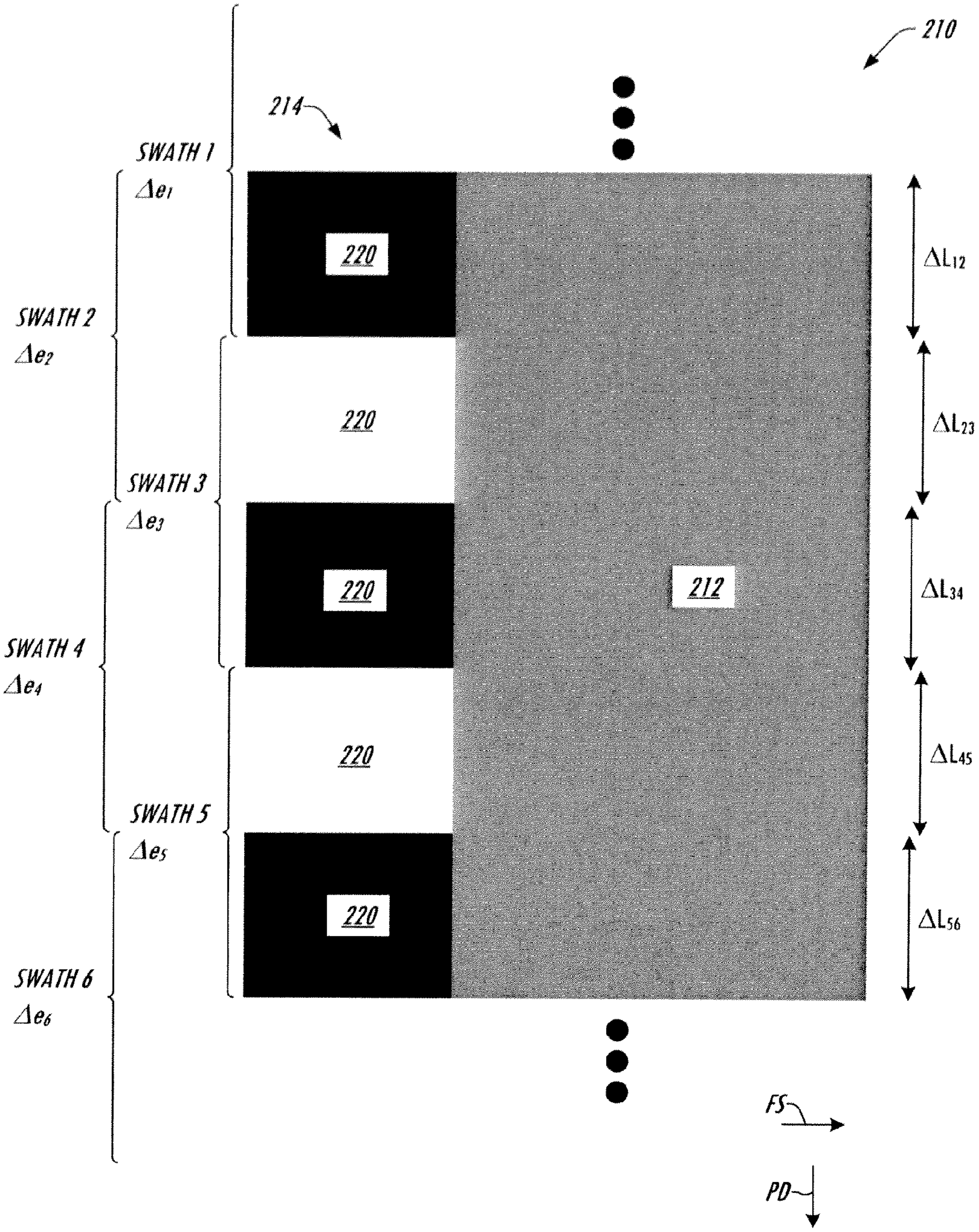
FIG. 3 is a schematic diagram illustrating a portion of one of the strips in the test print of FIG. 2 showing the overwriting contribution of sequential raster output scanner swaths and intensity variations of half swaths in the test print.

As seen in FIG. 2, the banding compensation test pattern 210 includes a plurality of strips 212 that extend along a process direction PD, where the strips 212 are spaced from one another along a generally perpendicular fast scan (e.g., cross-process) direction FS. In the illustrated example, 16 such strips 212 are used, but other embodiments are possible in which any integer number of strips 212 can be created in the banding compensation test pattern 210. In addition, as seen in FIGS. 2 and 3, one, some or all of the test pattern strips 212 include a plurality of fiducial markings 214 spaced from one another in the process direction PD. The insert 220 in FIG. 2 illustrates exemplary fiducial markings 214, where the period of the fiducials along the process direction PD may but need not be related to the spacing of the swaths. The fiducial markings 214 can be used to correlate the scanned test pattern 210 imprinted on the test page 200 to a digital test pattern of data used to operate the ROS when creating the pattern 210. The known digital test pattern design can be used to correlate the scan lines in the digital pattern to the swaths of scanlines created by ROS scanning along the fast scan direction FS. The number of scanlines from the lead edge 216 of each fiducial is known by the design of the digital test pattern. In addition, the swath or swaths used to write each fiducial and each portion of the strip is known by counting the number of beams in the swath and the swath-to-swath spacing. In this way, a particular reflective facet 526 of the rotating polygon 528 that was used in creating a given process direction portion of the strip 212 can be identified.

Referring also to FIG. 2, the banding compensation test pattern 210 is scanned at 112 in FIG. 1. In certain embodiments where the test pattern 210 is created on an intermediate belt such as the photoreceptor 404 in FIG. 12, the pattern 210 can be scanned or otherwise measured via a sensor array or scanner 460 positioned proximate an image-bearing side of the photoreceptor 404 downstream of the marking stations 402 in order to read toner density levels on the photoreceptor 404. In other embodiments, such as where the banding compensation test pattern 210 is created on a test page (e.g., test page 200 in FIG. 2), the test pattern can be scanned at 112 in FIG. 1 using a sensor or scanner 460 disposed near an image-bearing side of a printed sheet 408 downstream of a transfer station 406 and a fuser 410 as seen in FIG. 12. The sensor or scanner 460 can either be internal (in-board) or external to the marking engine 402, and may be internal or external to the document processing system 400. In these and other embodiments, the test pattern 210 is scanned at 112 in FIG. 1 to create banding compensation test pattern image data, for example, which indicates density level of toner applied to the photoreceptor 404 or to the test page 200.

At 114 in FIG. 1, the banding compensation test pattern image data is analyzed, for instance using a processor-based system such as an onboard system controller 422 of a document processing system 400 (FIG. 12) and/or by an external processor-based system (not shown) in a laboratory and/or manufacturing situation. The test pattern image data is analyzed at 114 to determine facet-specific banding errors corresponding to individual strips 212 of the banding compensation test pattern 210, with the fiducial markings 214 being used to correlate a specific polygon facet 526, or pair of facets 526 in the case of ROS overwriting, which are used in generating a particular portion along the process direction PD of the individual test pattern strips 212. More than one test pattern can be printed and analyzed to determine the facet dependent banding errors and the results averaged together to increase the measurement precision. A determination is made at 116 in FIG. 1 as to whether the determined facet-specific banding errors are within a predetermined specification, such as a range or a maximum limit value. If so (YES at 116), the process 100 proceeds to store the facet-specific banding correction profiles 526 in an electronic memory at 120. Otherwise (NO at 116), one or more of the facet-specific banding correction profiles 506 are selectively adjusted at 118 to add a correction to the current profile or profiles 506 in order to at least partially counteract the facet-specific banding errors determined at 114. This process may repeat one or more times at 110, 112, 114, 116 and 118 in FIG. 1 until an iteration termination condition is met, such as by the banding errors being within the specification at 116 and/or a maximum number of iterations has been reached, or satisfaction of any other suitable iteration termination condition.

The inventors have appreciated that banding errors may be identified in the process 100 by printing a full page halftone with a uniform area coverage, such as a 50% coverage of black toner in order to address banding associated with a given color separation. Moreover, the above process 100 may be repeated several times, with test patterns 210 being created for each separate color separation of a multi-color document processing system 400 (e.g., one each for cyan, magenta, yellow and black using individual marking stations 402 in FIG. 12 below), in which banding errors for a ROS of each of the individual marking stations 402 is characterized and corresponding banding compensation profiles 506 are generated and stored.

The analysis at 114 in certain embodiments includes calculation of a density profile as a function of position in the process direction PD, and a Fourier transform of the density profile is calculated at each position in the process direction PD. The inventors have appreciated that if periodic banding is present, the Fourier transform will have one or more peaks, and the frequency of the peaks can point to the subsystem responsible for the banding. In addition, the fundamental period is equal to the number of facets 526 in the motor polygon assembly 528 when the uniformity of the scan or intensity of the light varies from facet to facet. This analysis provides banding amplitude information, and ideally the banding compensation using the profiles 506 provides destructive interference with the identified banding errors. Accordingly, certain implementations of the process 100 in FIG. 1 further involve one or more of the spatial, intensity and/or phase calibrations at 102-106.

As seen in FIGS. 2 and 3, this exemplary banding compensation test pattern 210 for a black toner marking station 402 includes of a series of strips 212 at a uniform gray level, such as 50 percent area coverage in one implementation. The width of each strip 212 is set equal to the resolution at which the variation of the banding in the fast scan direction FS is needed or desired, and the strips 212 (or at least one of them) include a set of fiducial markings 214, shown in the inset in the FIG. 2 and also seen in FIG. 3. The fiducials 214 are used to determine the mapping between the scanned image (the test pattern image data obtained by the sensors/scanner 460 of FIG. 12 at 112 in FIG. 1) and the digital image (e.g., the data used to create the test pattern 210). Both the xerographic process and the process of scanning the test pattern 210 may induce distortions in the digital image of a few pixels, and the fiducials 214 allow the image processing to correlate each pixel in the scanned image to the scanline (and facet 526) that wrote the image.

In the document processing system 400 of FIG. 12, the ROS 500 (FIGS. 13-15) sweeps 32 beams across the photoreceptor, and overwriting can be used to improve the image quality. This involves the ROS 500 overwriting at least a portion of a previous swath scanned using one reflective facet 526 with a subsequent swath using a different reflective facet 526, where the fiducial markings 214 can be used to identify a particular pair of overwritten swaths corresponding to two reflective facets 526 of the ROS 500 (e.g., a "facet pair" or a "swath pair"). In this manner, the fiducial markings 214 facilitate correlation of the digital test pattern to a scanned test pattern (e.g., FIG. 2) as well as identification of particular scanlines in the digital test pattern. In one embodiment of this overwriting technique, the rotational velocity of the polygon 528 is adjusted so that the next sweep of the ROS 500 is translated 16 scanlines, or half the swath width such that each pixel of a 2400×2400 image is written by two different beams (overwriting), as seen in FIG. 3. Thus, a given process direction region or area of each of the strips 212 is effectively created by an identifiable swath pair, and thus can be correlated to a specific pair of reflective polygon facets 526, and this can be indicated using a "swath pair index", such as "½" indicating first and second facets 526 of the polygon 528, "5/6" indicating the fifth and sixth facets 526 of the polygon 528, etc.

The inventors have appreciated that a facet-specific swath intensity are the source of the variation in intensity of the half swaths. $\Delta e_i$ is the local intensity of swath i and $\Delta L_{i,i+1}$ is the intensity of a half swath written by facets i and facets i+1. The width of a half swath is 16 pixels at 2400 scanlines per inch ("spi"), or 4 pixels at 600 spi, the resolution at which the image is typically scanned using the sensors 460 (FIG. 12). In certain embodiments, every 8th group of 4 pixels can be averaged together, in sequence, and these are assigned to the measured half swath intensity, as set orth in the following equation:

$$\Delta L_{i,i+1} = \frac{2}{N}\sum_{j-1}^{N/32}\sum_{k=1}^{4} L_{32(j-1)+k+4i} - \frac{1}{N}\sum_{j=1}^{N} L_j$$

where N is the length in 600 spi pixels of the strip in the process direction PD, in the case where there are 4 pixels per half swath in the scanned image data, and there are 32 scan lines per swath. In this embodiment, the mean strip intensity is subtracted from each strip 212 to separate out cross process print density variations from the desired banding measurement. The triggering of the image video and the translation of the test pattern within the image can be done such that the corresponding facet 526 is identified using the fiducial markings 214 with respect to each particular point along the test pattern 210. In practice, this alignment can be confirmed by intentionally setting the exposure of the facet-specific banding compensation profile 506 associated with one or more facets 526 high and confirming that they are measured as having high toner density in the scanned test page 200.

Figure 4:
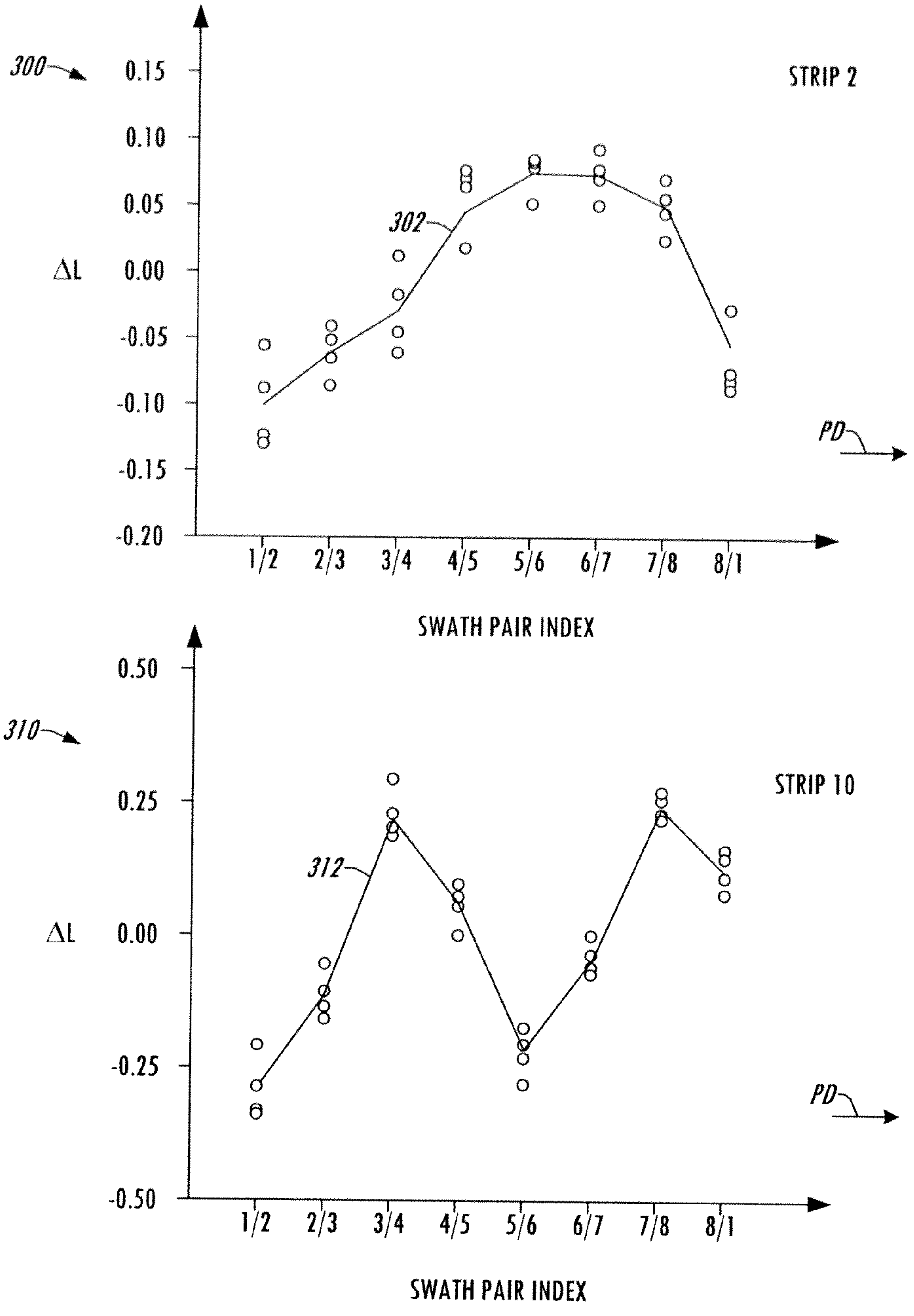
FIG. 4 illustrates two exemplary graphs showing facet intensity as a function of swath pair index for different test prints strips.

As seen in the graphs 300 and 310 of FIG. 4, the swath pair index is plotted on the horizontal axis, and the deviation of the measured luminance intensity or density L from the mean L (ΔL) is plotted on the vertical axis. In each graph 300, 310, four symbols are provided as a result of scans of four test prints 200 taken in sequence, where the graph 300 illustrates the data and a resulting line 302 which is the average of the half swath ΔL measurements from the four test prints for a second strip 212 ("strip 2"), and the graph 310 shows exemplary data and a resulting average profile 312 for "strip 10". The data for strip 2 (e.g., curve 302) near the inboard side of the test pattern 210 shows banding that is dominated by the once around of the motor polygon assembly (MPA) 528. On the other hand, the banding for strip 10 closer to the center of the pattern 210 is dominated by the first harmonic of the MPA once around. The precision of the measurement can be increased as necessary by scanning more banding compensation test patterns 210, and in the illustrated case, the standard deviation of the measurement for a swath pair intensity is 0.037 ΔL, which is the average of the 16×8=128 measurements of half swath intensity per print 210.

As noted above, certain embodiments of the process 100 in FIG. 1 can employ one or more of spatial calibration at 102, intensity calibration at 104 and/or phase calibration at 106.

Figure 5:
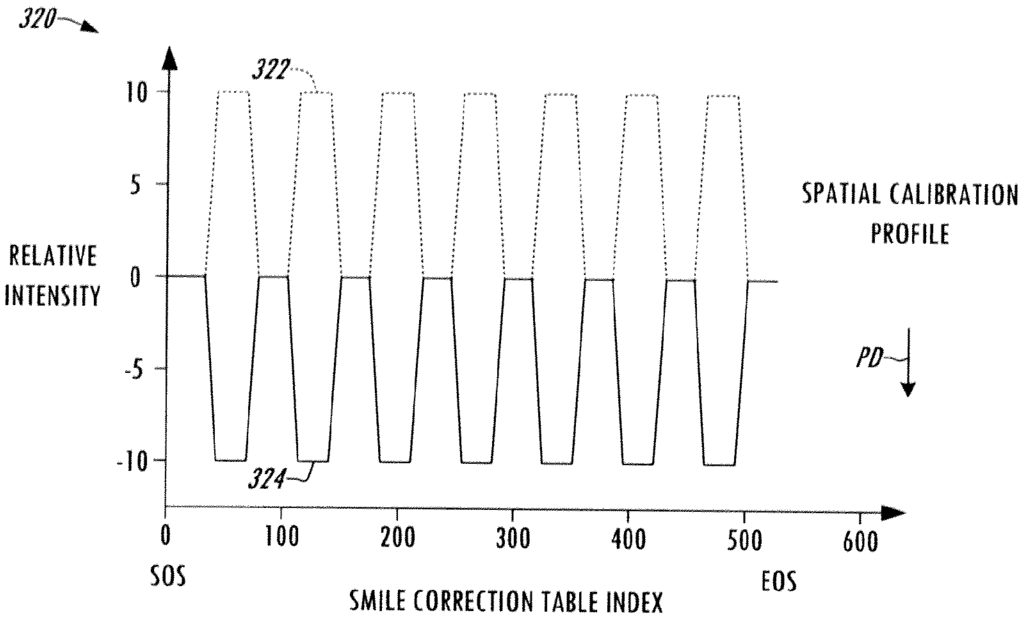
FIG. 5 is a graph illustrating exemplary spatial calibration banding correction profiles used in the method of FIG. 1.
Figure 6:
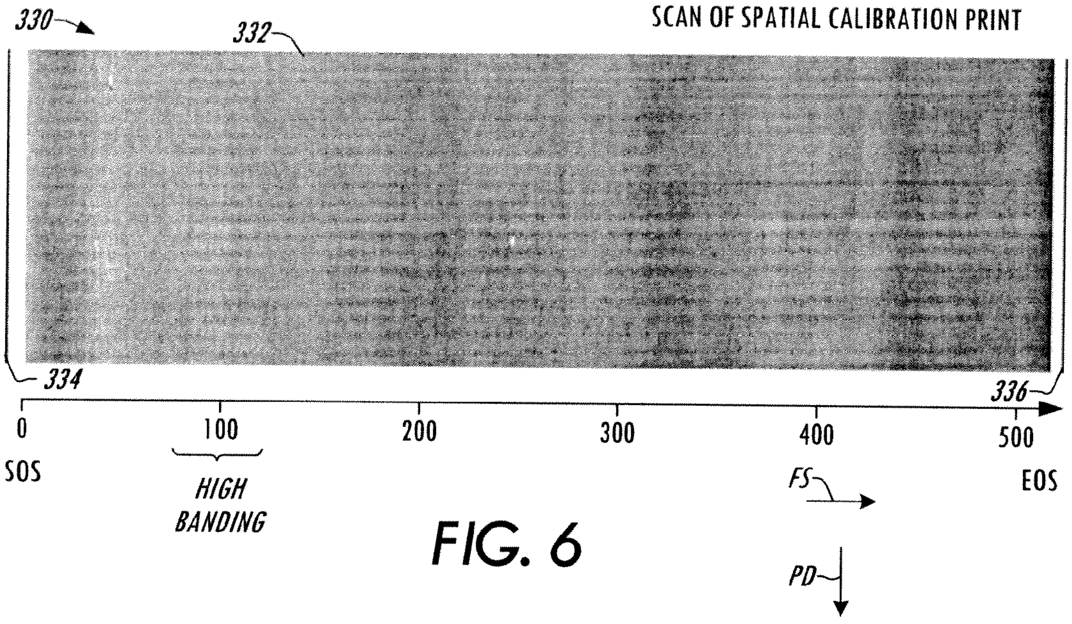
FIG. 6 is a schematic diagram illustrating a portion of an exemplary spatial calibration print scan showing different banding regions.
Figure 7:
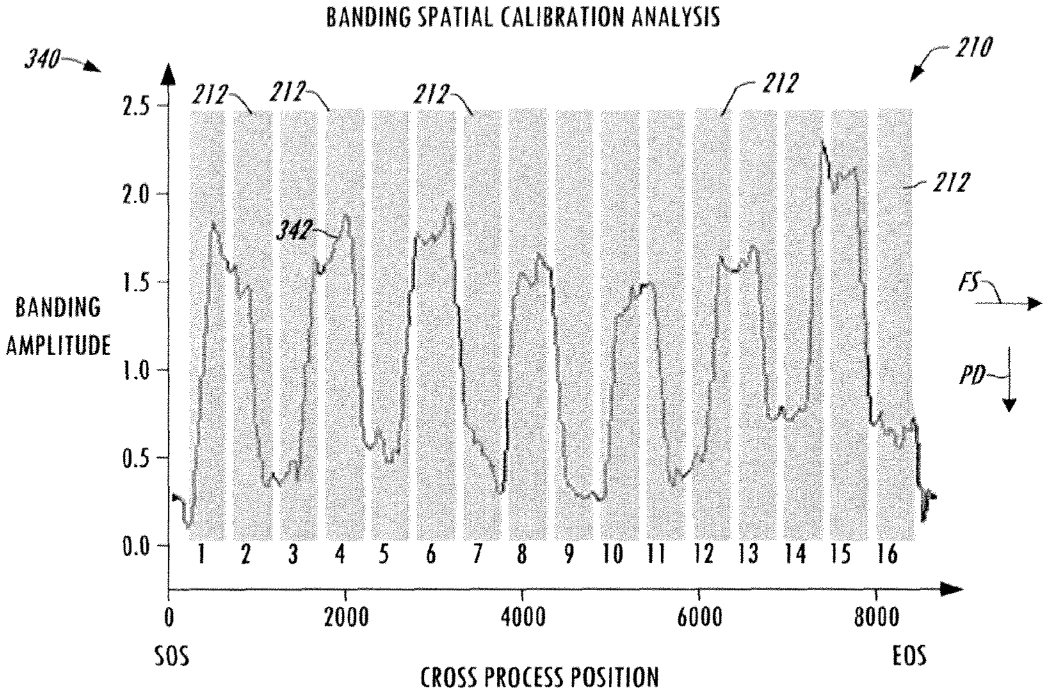
FIG. 7 is a graph illustrating an exemplary spatial calibration analysis in the process of FIG. 1.

Referring also to FIGS. 5-7, with respect to spatial calibration at 102, the exposure variation that is used to destructively interfere with the intrinsic banding is introduced through the banding compensation profile correction 506. The ROS 500 adjusts the light source output intensities according to these profiles 506 as it sweeps across the photoreceptor 404, where a particular profile 506 (or light-source specific set thereof) is provided for each polygon face 526. The intensity variation in certain implementations is provided to the ROS 500 via a table of numbers (smile correction table storing the profiles 506), which are related to the intended intensity of the set of beams as a function of fast scan position during scanning.

In certain embodiments, spatial calibration is performed at 102 in order to correlate indices of a table of the facet-specific banding correction profiles 506 to fast scan (cross-process) direction locations before the banding compensation processing at 110-120 in FIG. 1. FIG. 5 shows a graph 320 illustrating exemplary spatial calibration profiles 322 and 324 for the first four facets of the ROS and the next four facets of the ROS 526, respectively, and FIG. 6 shows a portion of an exemplary scan of a spatial calibration test pattern 332 printed on a test page 330. The test pattern 332 is created such that the start of scan (SOS) at fast scan position "0" is spaced from a first edge 334 of the test page 330, and the end of scan (EOS) at fast scan position "535" is spaced from the opposite edge 336 of the test page 330. The first edge 334 of the test page 330 can be identified by scanning the test page with a field of view larger than the test page with a black backing behind the test page.

The graph 340 in FIG. 7 shows an exemplary spatial calibration banding amplitude curve 342. The x-axis represents the number of pixels from the first edge 334 of the scanned test page 330. The y-axis quantifies the measured banding amplitude in some arbitrary units. In the same way, the banding test pattern 200 can be scanned with a black backing and a first edge 222 can be identified. Through image processing, the left edge 224 and the right edge 226 of each strip can be identified as a function of distance in pixels from the first edge 222. FIG. 7 overlays the result of this determination by coloring the background gray in the region between the measured left edge 224 and the measured right edge 226 for each strip.

One implementation of spatial calibration at 102 includes creating a spatial calibration test pattern 332 on the test page 330 (or on the photoreceptor 404 in FIG. 12) using the printer 400 or the marking station 402, where the ROS 500 is operated according to a plurality of facet-specific spatial calibration profiles 322, 324 (FIG. 5) to alternatively increase and then decrease the intensity of the light sources 514 for consecutive reflective facets 526 or groups thereof to introduce a known banding signature. The test pattern 332 is then scanned to create spatial calibration test pattern image data, and a banding magnitude is calculated as a function of fast scan position (banding amplitude curve 342 in FIG. 7) with reference to a first edge 334 of the test page 330 (or of a photoreceptor 404 in other embodiments). With this, the fast scan position of banding transition midpoints in the curve 342 are calculated and correlated with positions on the test page 330 (e.g., relative to an edge of the test page or an edge of the photoreceptor). Thereafter, fast scan direction positions are calculated of left and right edges of each strip of the spatial calibration test pattern, the transition midpoints positions are correlated to indices in the smile correction table, and the smile correction table indices are correlated to the strips in the test page or photoreceptor.

Thus, since the banding magnitude can vary along the fast scan direction, the spatial calibration at 102 allows correlation of the smile correction table entries (the values of the banding correction profiles 506) with the fast scan position on the print with reference to a first edge 334. As seen in FIG. 5, this is accomplished by performing the spatial calibration at 102 using correction profiles 506 that introduce a known banding signature. The upper profile 322 (shown in dashed line in the figure) is used for facets "1" through "4" that increases the light output intensity of the ROS 500 at 7 predefined positions as it sweeps the photoreceptor 404. For facets "5" through "8", a different correction profile 506 is used (curve 324 in FIG. 5) which decreases the intensity at the same predetermined fast scan direction positions. In one illustrative example, the ROS 500 can modify the intensity of the calibration profiles 506 at 535 uniformly spaced locations along the fast scan direction, and at each such position the ROS 500 is operable to keep the beam intensity constant, increase it by one numeric value, or decrease it by one numeric value. In the example of FIG. 5, the profiles 322 and 324 provide adjustment to selectively ramp the intensity value by 10 such numeric values between the relative intensity point "0" and the upper or lower values (+10 adjustment increments for profile 322 and −10 for profile 324 in this example).

The inventors have appreciated that if the change of intensity dominates the intrinsic banding, then seven regions of high banding will be introduced at seven positions in the spatial calibration test pattern 332 created on the test page 330. In the example of FIG. 6, the scanned test pattern 332 is shown in which the aspect ratio has been changed so that about 15 cycles of the banding runs between the top and bottom of the print, and one exemplary region of high banding is indicated in FIG. 6. The locations of the high banding are quantified by calculating the magnitude of the banding as a function of the fast scan direction position along the full page halftone, shown as curve 342 in FIG. 7. In this case, the transition between the regions of high banding and the regions of low intrinsic banding have a slope due to the number of numerical increments or "ticks" (e.g., 10 in the example of FIG. 5) required for the ROS 500 to change the correction amount from its nominal intensity to the induced banding intensity. The midpoint of each transition region is then calculated as a function of fast scan direction position to provide an offset from the first edge 334.

Correlating the banding transition midpoints to known fast scan table indices at the midpoint of the intensity change in the smile correction table allows determination of the distance from the edge of the page for each point in the banding correction profiles 506 stored in the ROS smile correction table. As seen in the graph 340 of FIG. 7, moreover, a fast scan direction position correlation can be provided between the smile correction table entries (the banding correction profiles 506) and the strip index (e.g., 1-16) in the banding test pattern 210 by scanning the strips 212 in the banding correction test pattern 210. The grey rectangles in FIG. 7 represent the measured positions of the strips 212 of the banding correction test pattern 210 as a function of distance from the lead edge 334. In certain embodiments, therefore, the paper edges from both scans (from the spatial calibration test pattern 332 (FIG. 6) at 102 in FIG. 1 and from the banding compensation test pattern 210 (FIGS. 2 and 3) at 110, 112 in FIG. 1) are used to align the scanned strip pattern and the scanned full page halftone. The left and right edges for each strip can be determined as a function of distance from the edge of the paper, and since the smile correction table can previously be correlated to the distance from the paper edge, the elements in the table that address each strip can be determined.

Figure 8:
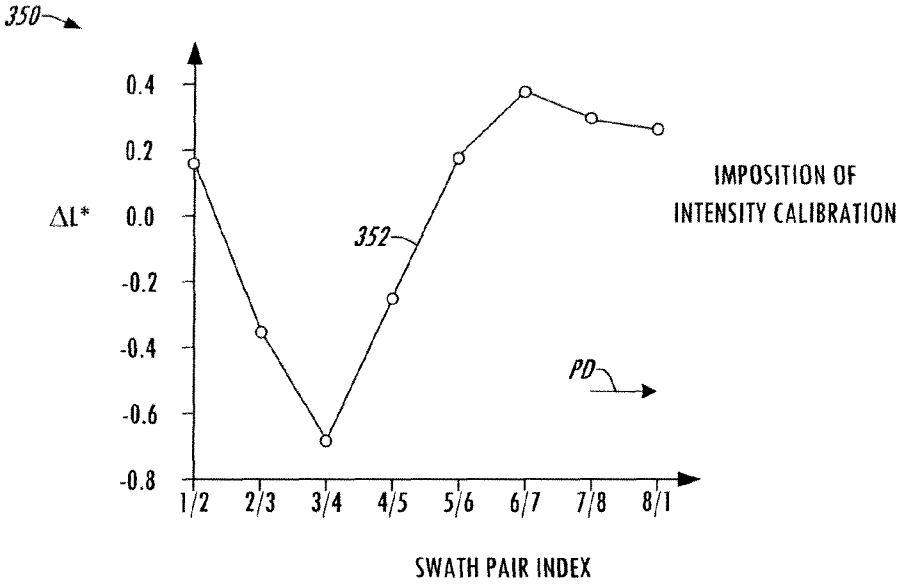
FIG. 8 is a graph illustrating an exemplary intensity calibration analysis in the process of FIG. 1.

Referring also to graph 350 in FIG. 8, certain embodiments of the method 100 also include performing an intensity calibration at 104 to correlate changes in intensity of the ROS light source(s) 514 with changes in print density prior to creating the banding compensation test pattern at 110. In one possible example, an intensity calibration test pattern (not shown) is created on a test page 200 or on the photoreceptor 404 using facet-specific intensity calibration profiles with a first group of one or more profiles at a nominal light source intensity level and a second group of profiles at a different light source intensity level. In one example, an intensity calibration profile sets the exposure level of the light sources 514 when scanning using facets "3" and "4" to a high exposure level while keeping the light output at a nominal level when scanning using the other facets 526. Using this set of facet-specific intensity calibration profiles 526, the intensity calibration test pattern is created on a test page or on the photoreceptor. The anticipated result of scanning the test pattern would be expected to indicate that the half swath written (using overwriting) with facets 3 and 4 (swath pair index ¾) would be the darkest, the half swath written with facets 2 and 3 and with facets 4 and 5 to be half as dark, and the rest of the half swaths should be at the nominal intensity. The intensity calibration test pattern is then scanned (e.g., using one or more sensors 460 in FIG. 12) to create intensity calibration test pattern image data, and an intensity sensitivity value can be calculated based on the differences in the measured intensity (e.g., toner density) levels and according to the difference between intensity calibration test pattern image data created using the first and second profile groups, taking into account the use of overwriting as necessary.

The graph 350 in FIG. 8 shows the relative density of each swath pair 352 resulting from this imposition of the intensity calibration at 104 using the above described example intensity calibration test pattern. In this graph 350, the horizontal axis indicates the swath pair index, and the vertical axis indicates measured luminosity ($\Delta L^*$) averaged across all of the strips of the test pattern. In this example, the smile correction table was increased by approximately 2% in exposure intensity. The halfswath intensity changed by 0.93 $\Delta L^*$ (the difference between swath pair index ¾ and swath pair indices ½, ⅚, 6/7, ⅞, and 8/1), and thus the sensitivity s=0.047 $\Delta L^*$ per ROS exposure change increment.

Figure 9:
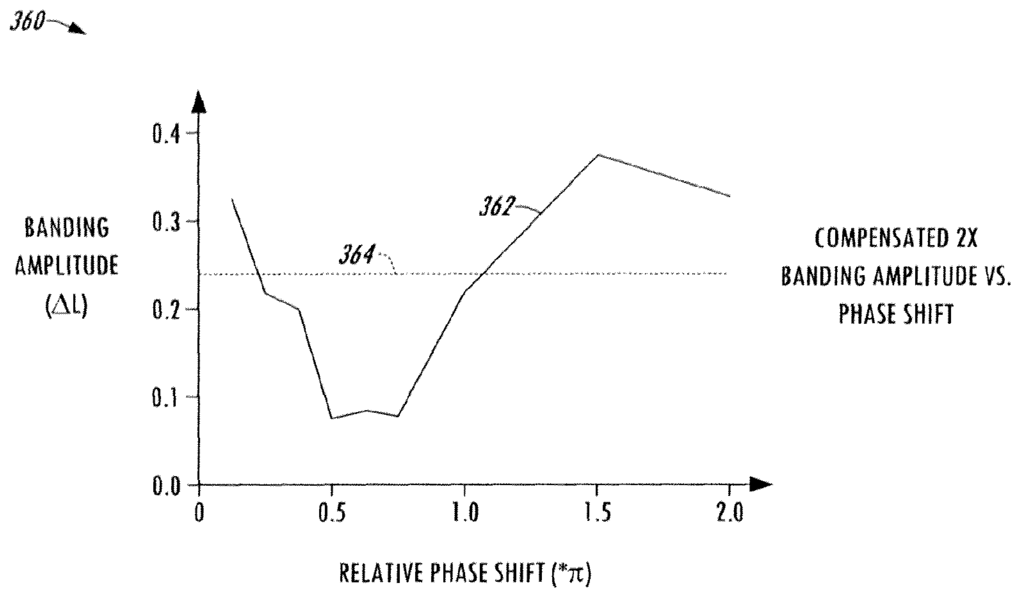
FIG. 9 is a graph illustrating a an exemplary 2× phase shift calibration analysis.

Referring also to FIG. 9, the process 100 of FIG. 1 may also include phase calibration at 106 prior to printing the banding compensation test pattern at 110. As mentioned above (e.g., FIG. 3), when overwriting is used in the ROS, each reflective facet 526 concurrently scans a swath including a plurality of scan lines across the test page 200 or the photoreceptor 404 in the fast scan direction FS, and the ROS 500 overwrites at east a portion of a previously scanned swath (created via one face 526) with a subsequent swath (created using a different reflective face 526). At 106 in FIG. 1, the phase calibration can be used to correlate facet-specific banding correction profiles 506 at one or more specific strips in the fast scan direction and a relative phase between a density variation in the test pattern image data 200 for the corresponding strips. Thus, phase calibration can facilitate identification of a phase difference where the measured density variation at a fundamental or harmonic of the polygon rotation is compensated by an applied exposure variation of the same frequency.

With respect to compensating for banding in the ROS 500, the determination of the banding correction profiles 506 in the absence of overwriting can be done by a number of different approaches. If a particular swath on a particular strip always printed too dark, the banding correction profile 506 for the corresponding reflective face 526 could be adjusted at 118 in FIG. 1 in order to decrease the laser exposure at the position of the strip 212. The spatial calibration at 102 could be used to determine which location in the table these correction values would be loaded and the intensity calibration 102 would determine the magnitude of the change in the intensity required.

The banding compensation profile adjustment at 118 in FIG. 1 is complicated if overwriting is used in the ROS 500. For example, if all the half swaths have the same density except half swath ⅔ is brighter, decreasing the intensity of facet 2 causes the half swath ½ to become darker, and likewise decreasing the intensity of facet 3 will cause the half swath ¾ to become darker. In accordance with certain aspects of the present disclosure, this correlation in the effects of adjustment to individual facet-specific profiles 506 is addressed by correcting the once around of the intensity variation and its harmonics, rather than simply performing adjustments on a swath-by-swath basis.

With respect to the fundamental frequency, i.e., a banding variation having a period of eight half-swaths, the density variation can be quantified in terms of amplitude and phase. In order to determine the compensating signal at 118 in FIG. 1, a banding compensation profile 506 is used that gives a sinusoidal variation at a particular strip 212 that has a dominant first harmonic of the once around banding. Knowing the amplitude of the correction signal that should be applied from the intensity calibration at 104, but without knowing the relative phase between the density variation and the correction signal, the phase can be experimentally determined by applying a series of corrections of different relative phases, which can be part of the phase calibration process 106 in FIG. 1. If the correct phase difference between the density variation and the compensating signal applied at 118 is chosen, then the correction will destructively interfere with the density variation and the banding will go close to zero.

The application of this technique is shown in the graph 360 of FIG. 9. In this figure, the dashed line 364 shows the uncompensated 2× banding amplitude at a particular strip in the fast scan direction, and the solid curve 362 plots the measured banding amplitude when a compensating signal close to the required amplitude for compensation is applied at a variety of different phases. As seen in FIG. 9 between $\pi/4$ and $3\pi/8$, the compensating signal destructively interferes with the intrinsic banding and the resultant banding is low. Near $3\pi/8$ (e.g., 180 degrees out of phase) the compensating signal reinforces the intrinsic banding as the banding amplitude increases. A similar calibration can be performed on a strip where the 1× banding is of sufficient magnitude to characterize the destructive and constructive interference as a function of phase. The phase shift to compensate 1× banding is not necessarily the same as the phase shift to compensate 2× banding.

The banding compensation adjustment at 118 in FIG. 1 may depend on the sensitivity of print density to the smile correction exposure sensitivity. In certain embodiments, a technique to make the print self-calibrating can be used in which banding is introduced at a different frequency from the intrinsic banding. In this approach, the ratio of the introduced banding and the intrinsic banding gives the sensitivity factor. For example, if banding with an amplitude of 10 ROS adjustment increments is introduced, resulting in induced banding with an amplitude that is 2 times the intrinsic banding, then only 5 ROS adjustment increments are needed to compensate it.

For systems in which the ROS does not allow introduction of banding at a different frequency, one of the strips 212 can be used as a calibration strip. Two neighboring facets 526 can be set to a high exposure as the ROS 500 sweeps across this strip 212. This will result in the calibration profile shown in FIG. 8. In other words, the intensity calibration, instead as being performed as a separate step 104 in FIG. 1 would be part of the analysis in step 114 in FIG. 1.

In the absence of overwrite, the phase of the banding compensation profile adjustment at 118 to compensate the measured banding could be phase shifted by $\pi$ force destructive interference. Because of overwriting, no one-to-one correspondence may exist between the phase of the banding and the phase of the compensating signal. If facet 1 has the highest intensity, it will increase the densities of the half swath ½ and of the half swath 8/1. The phase shift is not $\pi$ for the first harmonic, and the phase shift of the second harmonic is not the same as the phase shift of the first harmonic. To generate the compensating exposure profile, the Fourier transform of the half swath density profile (FIG. 4) can be calculated in certain embodiments. The phase and amplitude of the coefficients corresponding to the fundamental and the first harmonic are calculated. The amplitude is scaled according to the intensity calibration in step 104, and the phase is shifted according to the phase calibration in step 106. Then the inverse Fourier transform is calculated to determine the compensating exposure profile. If the amplitude calibration is accurate, and the measurement noise is low, the compensating adjustment at 118 may be computed with a single measurement. However, if there are errors in either of these quantities, it may be necessary to iterate this process one or more times at 110, 112, 114 and 116 as described above.

Figure 10:
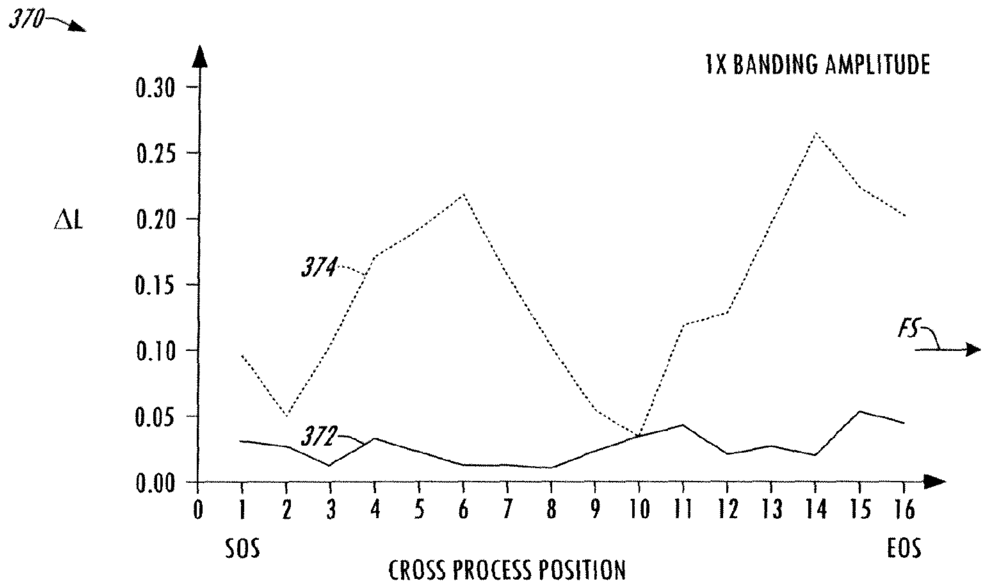
FIGS. 10 and 11 are graphs illustrating exemplary 1× and 2× banding reduction using the electronic banding compensation profiles generated by the process of FIG. 1.
Figure 11:
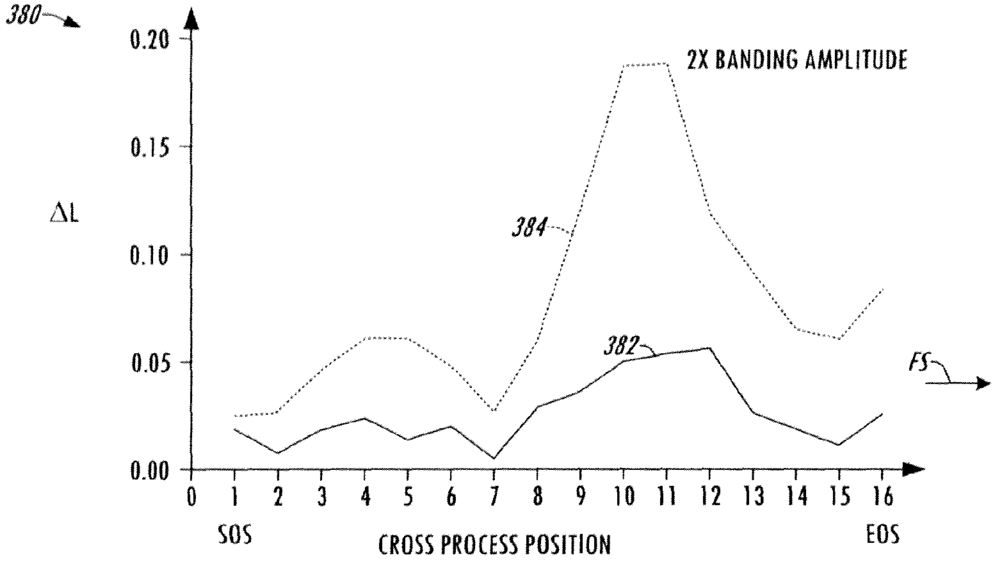

Referring also to FIGS. 10 and 11, the graph 370 in FIG. 10 illustrates the amplitude ($\Delta L$) of the once around banding and the graph 380 in FIG. 11 illustrates the magnitude of the twice around banding as a function of the fast scan position. In particular, the curve 374 in FIG. 10 (and curve 384 and FIG. 11) shows the banding amplitude before the compensation (e.g., using banding compensation profiles 506 equal to zero). The curve 372 in FIG. 10 and the curve 382 in FIG. 11 illustrates the banding after the above described electronic banding compensation process 100 of FIG. 1. As seen in FIGS. 10 and 11, both the fundamental frequency and the first harmonic can be simultaneously mitigated using the process 100.

Referring now to FIGS. 12-15, as noted above, the process 100 can be used to generate electronic banding compensation profiles 506 using onboard processing elements 422 and sensors 460, or the process 100 may be performed using external computational and analytical components. FIGS. 12-15 show an exemplary document processing system 400 (FIG. 12) and a ROS 500 thereof (FIGS. 13-15) in which stored banding correction profiles 506 can be used to selectively vary the output level of one or more modulated light outputs 522 to mitigate banding in a normal printing operation. In addition, the system 400, if equipped with a scanner or other sensors 460, may implement automated banding compensation in accordance with the above described processes. The illustrated document processing system 400 is a multi-color including a system controller 422 with which one or more of the above described processing functions may be implemented. In this system 400, and multiple individual marking devices 402 (print engines) each including a ROS 500 (FIGS. 13-15) that may be initially setup or thereafter adjusted for banding correction in accordance with the method 100 above. The marking 402 individually transfer toner marking material onto an intermediate transfer belt (ITB) 404 (photoreceptor) traveling past the marking devices 402.

Figure 13:
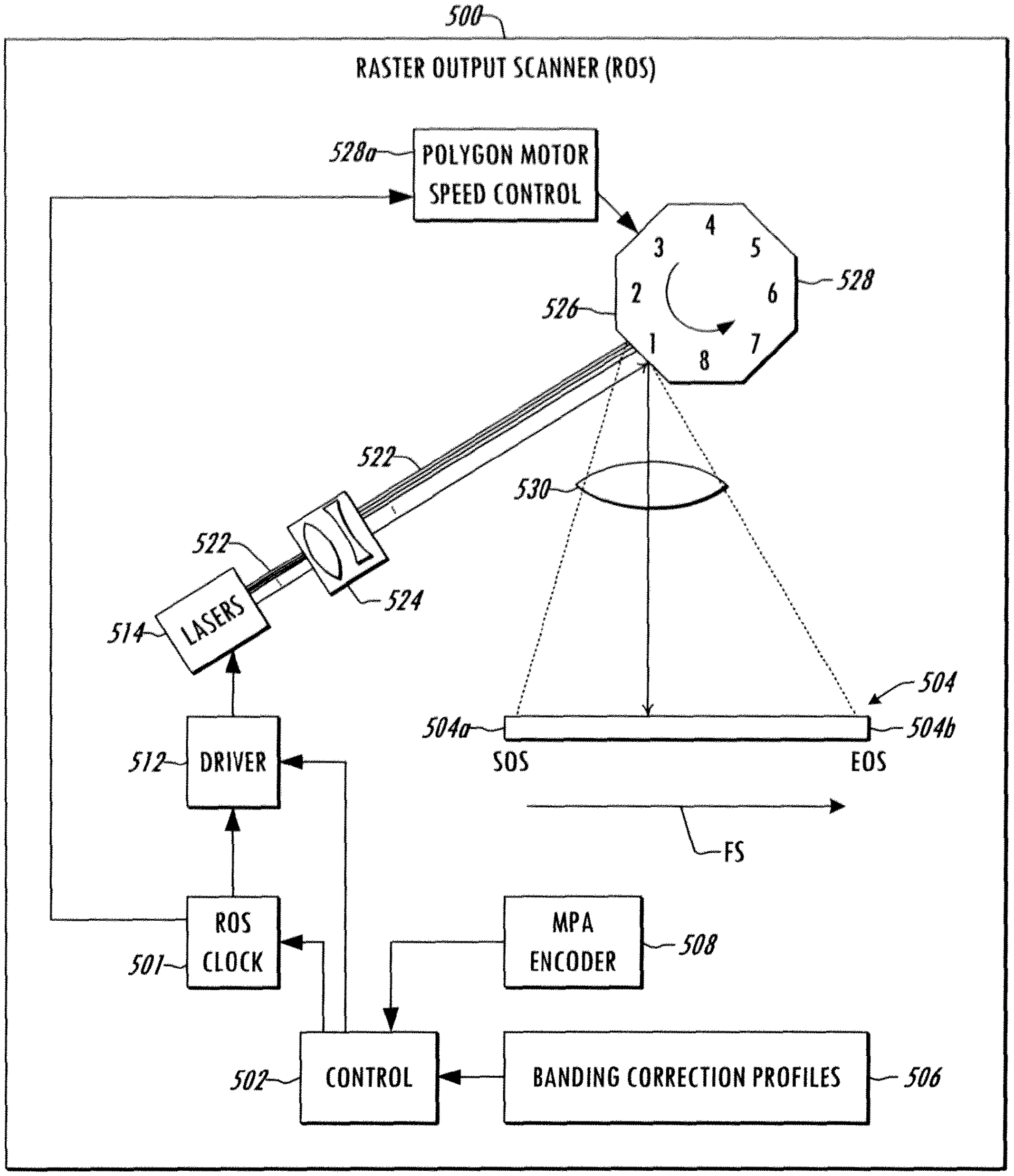
FIGS. 13-15 are simplified schematic diagrams illustrating an exemplary ROS using MPA facet-specific banding correction profiles for compensation of banding errors in accordance with various aspects of the disclosure.

As seen in FIG. 13, in certain embodiments, the marking devices 402 may individually include a cylindrical drum photoreceptor 504 employed as an intermediate transfer substrate for subsequent transfer to the intermediate transfer belt 404 before final image transfer to a final printable media 408, such as cut sheet paper. The illustrated printing system 400 includes a transfer station 406 (FIG. 12) downstream of the marking devices 402 to transfer marking material from the IBT 404 to an upper side of a final print medium 408 traveling along a path P1 from a media supply. After the transfer of toner to the print medium 408 at the transfer station 406, the final print medium 408 is provided to a fuser type affixing apparatus 410 along a path P1 where the transferred marking material is fused to the print medium 408. In other embodiments, a single photoreceptor belt 404 is used with the marking devices 402 forming an image on the photoreceptor belt 404, and the image developed on the belt is directly transferred to a printed medium 408. In this regard, the banding compensation techniques illustrated and described herein can be employed in intermediate belt transfer (IBT) type systems and/or in non-IBT systems.

The system controller 422 performs various control functions and may implement digital front end (DFE) functionality for the system 400. In addition, the document processing system 400 may implement the above described techniques for creating and/or adjusting facet-specific banding correction profiles 506. In this regard, the controller 422 may implement the above described process 100 using the marking engines 402 and one or more sensors 460. The controller 422 can be any suitable form of hardware, processor-executed software and/or firmware, programmable logic, or combinations thereof, whether unitary or implemented in distributed fashion in a plurality of processing components.

In a normal printing mode, the controller 422 receives incoming print jobs 418 and operates one or more of the marking devices 402 to transfer marking material onto the ITB 404 in accordance with image data of the print job 418. In a banding compensation adjustment mode, the controller 422 operates in accordance with the above described process 100. In operation of the marking devices 402, marking material (e.g., toner 451 for the first device 402 in FIG. 12) is supplied to an internal drum photoreceptor 504 (schematically shown in FIG. 13) via a ROS 500 of the marking device 402, and toner 451 is transferred to the ITB 404 with the assistance of a biased transfer roller (not shown) to attract oppositely charged toner 451 from the drum 504 onto the ITB surface as the ITB 404 passes through a nip between the drum 504 and the biased transfer roller. The toner 451 ideally remains on the surface of the ITB 404 after it passes through the nip for subsequent transfer and fusing to the final print media 408 via the transfer device 406 and fuser 410 in FIG. 12. In the multicolor example of FIG. 12, each xerographic marking device 402 is operable under control of the controller 422 to transfer toner 451-454 of a corresponding color (e.g., cyan (C), magenta (M), yellow (Y), black (K)) to the transfer belt 404. The system 400 also includes one or more sensors 460 internal to the marking stations 402 and/or external thereto, for instance, to measure one or more marking material transfer characteristics such as toner density relative to the intermediate transfer belt 404 or other photoreceptor or with respect to a final printed medium 408, and corresponding feedback signals or values are provided to the controller 422.

Figure 14:
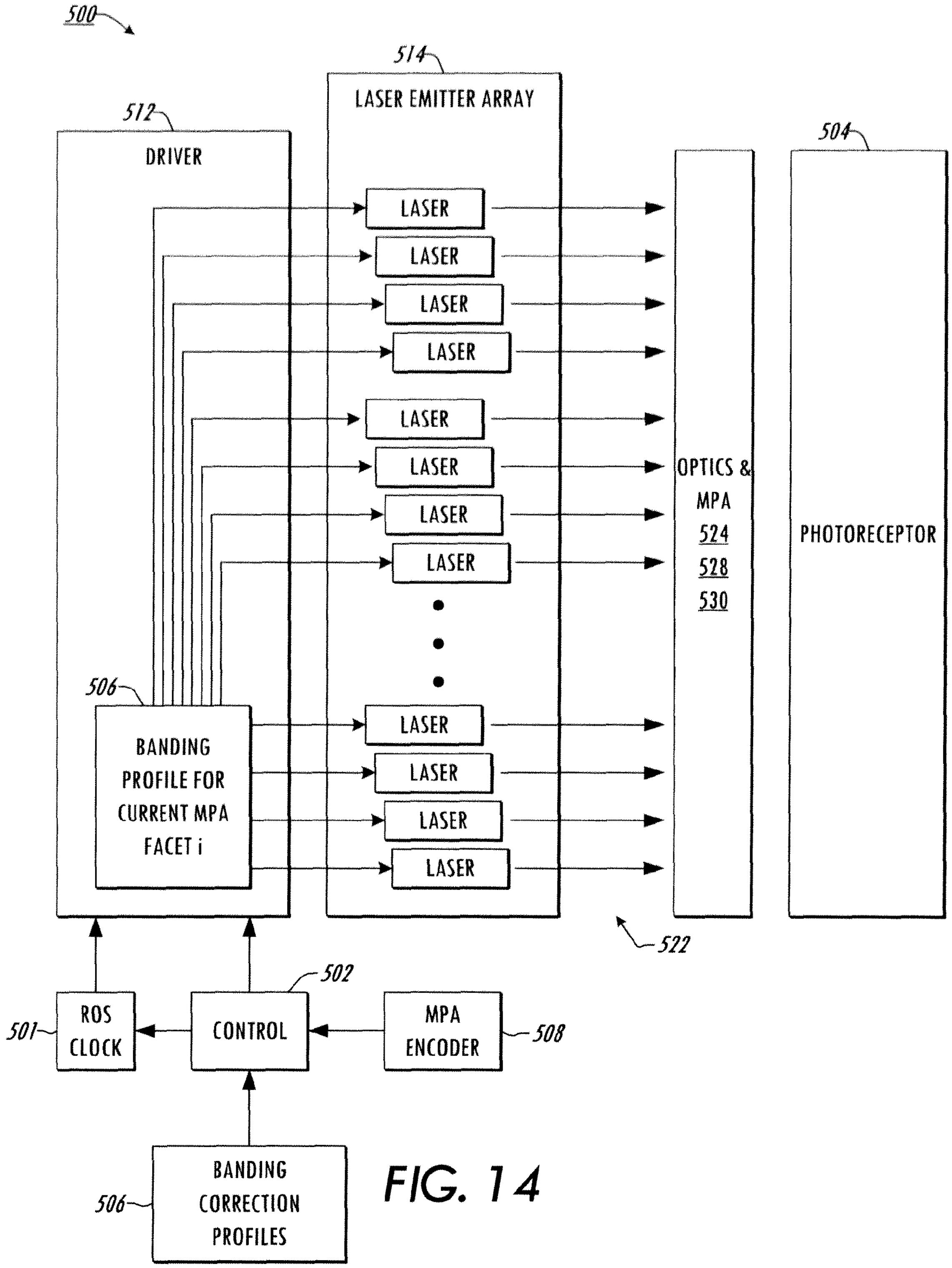
Figure 15:
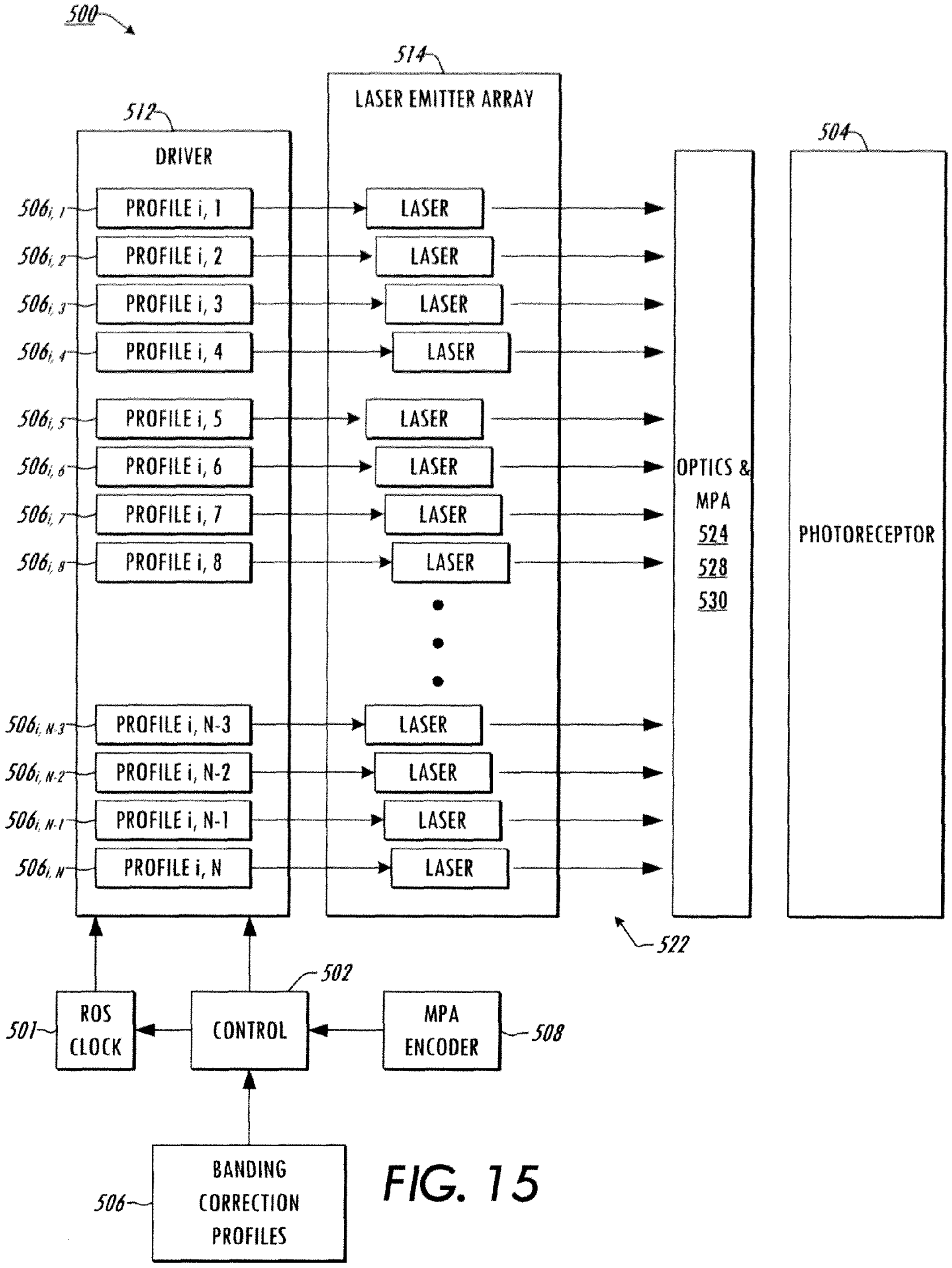

As seen in FIGS. 13-15, the exemplary xerographic stations 402 each include a single or multi-beam ROS 500 which generates latent images along a circuitous length of a drum type photoreceptor 504 (shown in partial section view with the process direction into the page in FIG. 13) using a plurality of beams 522. While illustrated in the context of the multi-beam ROS 500, the various aspects of the present disclosure can also be used in a single-beam ROS. A ROS controller 502 provides one or more control signals or values to a driver 512 and a ROS clock 501, and a stream of image data is provided from the controller 502 to the driver 512 associated with 32 laser-type light sources 514, for instance, arranged as a laser emitter array of eight groups of four lasers in one embodiment. The ROS controller 502 also operates the ROS clock 501, which in turn provides a clock output to the driver 512 and to a motor polygon assembly (MPA) that includes a polygon motor speed control **528*a* and the rotating polygon 528 with a plurality of reflective (e.g., mirrored) outer surfaces or facets 526 (eight facets 526 are shown for illustration in the example of FIG. 13, but other embodiments may have more or fewer facets 526**, such as 16 in the examples discussed above).

In operation, a stream of image data is provided to the driver 512 associated with a single color portion of a panel image in the printer 400, and the driver 512 modulates the lasers 514 to produce a plurality of modulated light outputs or beams 522 in conformance with the input image data. The laser beam light output 522 passes into conditioning optics 524 and then illuminates a face 526 of the rotating polygon 528. The light beams 522 are reflected from the polygon face 526 through imaging optics 530 to form corresponding spots on the photosensitive image plane portion of the passing photoreceptor 504 drum. Rotation of the face 526 causes the spots to be swept or scanned across the image plane in the cross-process or fast scan direction FS to form a succession of scan lines generally perpendicular to a "slow scan" or process direction PD along which the photoreceptor 504 travels. In the multi-beam arrangement of the ROS 500, 32 such scan lines are created concurrently as a group or swath with the image data provided to the individual lasers 514 being interleaved accordingly. Successive rotating facets 526 of the polygon 528 form successive sets or swaths of 32 scan lines that are offset from each other as the photoreceptor 504 travels in the process direction. In this regard, each face 526 may scan 32 scan lines, but the photoreceptor 504 may move such that the top 16 scan lines from the next face 526 can overlap the bottom 16 scan lines from the previous facet 526 in an interleaved or overlapped fashion. In this regard, the disclosed concepts can be used in systems in which scan lines are overwritten (overlapped) with or without interleaving, and/or in systems that employ interleaving with scan lines from a subsequent swath written in between scan lines from a previous swath, or combinations or variations thereof.

Within each set of 32 scan lines, moreover, the laser emitter array 514 provides mechanical spacing of the individual light outputs 522 such that the spacing of adjacent scan lines is ideally uniform. Each such scan line in this example consists of a row of pixels produced by modulation of the corresponding laser beam 522 according to the corresponding image data as the laser spots scan across an image plane, where individual spots are either illuminated or not at various points as the beams scan across the scan lines so as to selectively illuminate or refrain from illuminating individual locations on the photoreceptor 504 according to the input image data. In this way a latent image is created by selectively discharging the areas of the photoreceptor 504 which are to receive a toner image. Exposed (drawn) portions of the image to be printed move on to a toner deposition station (not shown) where toner adheres to the drawn/discharged portions of the image. The exposed portions of the image with adherent toner then pass to a transfer station with a biased transfer roller (BTR, not shown) for transfer of the toner image to the intermediate transfer belt (ITB 404 in FIG. 12 above).

As seen in FIGS. 13-15, moreover, the ROS driver 512 selectively employs banding correction or compensation profiles 506 under direction of the ROS controller 502 to vary the output level of the light outputs 522 provided by the light source or sources 514 during scanning by a given reflective face 526 in order to mitigate banding in the final print media 408, and these compensation profiles 506 can also be used during the processing 100 in FIG. 1 above. The MPA polygon 528 then directs the modulated light outputs 522 toward the photoreceptor medium 504 along the fast scan direction to generate an image on at least a portion of the medium 504. As seen in FIG. 13, moreover, rotation of the current face 526 of the polygon 528 scans the one or more modulated light outputs 522 directly or indirectly to the photoreceptor 504 along the fast scan direction FS, where one or more optical components may lie between the polygon face 526 and the photoreceptor 504, where one simplified example (lens 530) is illustrated in FIG. 13. In operation, the controller 502 of the ROS 500 (FIGS. 13-15) causes the driver 512 to selectively vary the output level of the light output(s) 522 provided by the light source(s) 514 during scanning by a given reflective face 526 so as to mitigate banding according to a given one of the banding correction profiles 506 that corresponds to the given reflective face 526.

In certain embodiments, the ROS 500 includes an MPA encoder 508 which provides an output to the ROS controller 502, which can be any signal or value that indicates the identity of the given reflective face 526 of the rotating polygon 528 that is currently scanning light output(s) 522. The controller 502, in turn, selects a given one of a plurality of banding correction profiles 506 that corresponds to the given reflective face 526 according to the indication from the MPA encoder 508. In this manner, one or more selected banding correction profiles 506 are insured to correspond to the currently-used MPA face 526, and thus the particular banding effects associated with the current MPA face 526 can be effectively mitigated through selection of the proper (corresponding) banding correction profile or profiles 506.

As seen in FIG. 14, in certain embodiments that use multiple light sources 514 (e.g., an array of 32 lasers 514 in the illustrated example), the controller 502 may cause the driver 512 to selectively vary the output level of all the modulated light outputs 522 provided by the light sources 514 according to a single profile 506 that corresponds to the current MPA facet 526. In one possible implementation, the ROS 500 may include programmable logic, such as an application specific integrated circuit (ASIC) that controls the operation of the laser source(s) 514.

The ROS ASIC in certain embodiments allows the controller 502 & driver 512 to vary the laser output level from the start of a scan (SOS) to the end of a scan (EOS) across the fast scan direction FS. It is noted that this feature can be used in simplified form for "smile correction" to compensate for ROS output intensity variation and optical system effects in the fast scan direction FS with respect to density variations that may be independent of MPA facet. Moreover, such effects can be characterized and used in the generation of the banding correction profiles 506, for instance, with the normal "smile correction" effects being added into the characterization of the facet-specific banding effects such that the generated banding correction profiles 506 operate to counteract both the non-facet-specific (smile correction) effects as well as the facet-specific banding effects.

In the example of FIG. 14, moreover, the controller 502 uses the indication from the MPA encoder 508 to identify which MPA face 526 is currently being used and selects the corresponding banding correction profile 506 from the plurality of profiles 506 (e.g., stored in ROS memory) and causes the driver 512 to modify or vary the outputs of the laser array 514 according to the selected profile 506. For instance, if the first MPA facet 526 (facet "1" in FIG. 13) is currently being used to reflect the light outputs 522 from the laser array 514, the controller 502 receives an indication of the current face 526 from the MPA encoder 508, and accordingly selects the banding profile 506 for MPA facet "1". In this example, the ROS 500 stores an integer number "i" of banding correction profiles 506. In other embodiments, the ROS 500 may employ a single laser or other type of light source 514, in which case the controller 502 selects a particular banding profile 506 according to the indication from the encoder 508 from a plurality of banding correction profiles 506 including an integer number i profiles 506 (i greater than 1) corresponding to the number of polygon facets 526.

FIG. 15 shows another example using multiple laser light sources 514 (e.g., 32 in the illustrated implementation), in which more than one banding correction profile 506 is used for a given MPA face 526. In one possible embodiment, a profile 506*i*,N is provided for each light source 514 for each MPA face 526. For instance, in a ROS 500 having a polygon 528 with 8 rotating facets 526 (i=8) and 32 light sources 514 (N=32), a total of 256 banding correction profiles 506 can be stored in the ROS 500, with the controller 502 selecting a group of 32 of the profiles 506 for a given current MPA face 526. The ROS controller 502 then causes the driver 512 to selectively vary the outputs of the corresponding laser light sources 514 according to the corresponding one of the 32 selected profiles 506. In one possible implementation, the ROS 500 may include an ASIC or other logic providing the capability to modify 32 individual smile correction functions, wherein the controller 502 can utilize such logic to employ the facet-specific profiles 506 as the smile correction functions, and to update these according to the currently-used MPA face 526. In other possible embodiments, two or more banding correction profiles 506 can be used for a given MPA face 526, where two or more light sources 514 can use the same facet-specific profile 506.

The above embodiments thus allow the cross-process direction banding affects to be corrected on a scanline-by-scanline basis and/or on a swath-by-swath basis (electronic banding correction or compensation), thereby facilitating control over measurable MPA harmonic banding in a given document processing system 400, including the variation (amplitude and phase) in the cross-process direction, wherein the ROS controller 502 can employ a facet-by-facet variation in the smile correction function, varying in amplitude and phase in the cross-process/fast scan direction, which will compensate for MPA harmonic banding at all fast scan locations between the start of scan (SOS) and the end of scan (EOS) locations.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms “including”, “includes”, “having”, “has”, “with”, or variants thereof are used in the detailed description and/or in the claims, such terms are intended to be inclusive in a manner similar to the term “comprising”. It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method for generating electronic banding compensation profiles, the method comprising:

creating a banding compensation test pattern on a test page or a photoreceptor according to a digital test pattern using a printer or a marking station with a raster output scanner (ROS) having a rotating polygon with a plurality of reflective facets and at least one light source directing light toward the rotating polygon with an intensity controlled during scanning using a given one of the plurality of reflective facets according to a corresponding one of a plurality of facet-specific banding correction profiles, the banding compensation test pattern comprising a plurality of strips individually extending along a process direction and spaced from one another along a fast scan direction generally perpendicular to the process direction, where at least one of the strips includes a plurality of fiducial markings spaced from one another in the process direction to correlate the digital test pattern to a scanned test pattern;

scanning the banding compensation test pattern to create banding compensation test pattern image data;

using at least one processor, analyzing the banding compensation test pattern image data to determine facet-specific banding errors corresponding to individual strips of the banding compensation test pattern; and using the at least one processor, selectively adjusting at least one of the plurality of facet-specific banding correction profiles to at least partially counteract the determined facet-specific banding errors.

2. The method of claim 1, further comprising performing a spatial calibration to correlate indices of a table of the facet-specific banding correction profiles to locations on the test page or the photoreceptor in the fast scan direction prior to creating the banding compensation test pattern.

3. The method of claim 2, wherein performing the spatial calibration comprises:

creating a spatial calibration test pattern on a test page or on the photoreceptor using the printer or the marking station and a plurality of facet-specific spatial calibration profiles to alternatively increase and then decrease the intensity of the at least one light source for consecutive reflective facets or groups thereof to introduce a known banding signature;

scanning the spatial calibration test pattern to create spatial calibration test pattern image data;

calculating a banding magnitude as a function of position along the fast scan direction according to the spatial calibration test pattern image data;

calculating a position in the fast scan direction of a banding transition midpoint of each of a plurality of transition regions in the banding magnitude relative to an edge of the test page or an edge of the photoreceptor;

calculating positions in the fast scan direction of left and right edges of each strip of the spatial calibration test pattern; and correlating the positions of the banding transition midpoints to indices in a smile correction table; and correlating the indices in the smile correction table to the strips in the test page or the photoreceptor.

4. The method of claim 2, further comprising performing an intensity calibration to correlate changes in intensity of the at least one light source with changes in print density prior to creating the banding compensation test pattern.

5. The method of claim 4, wherein performing the intensity calibration comprises:

creating an intensity calibration test pattern on a test page or on the photoreceptor using the printer or the marking station and a plurality of facet-specific intensity calibration profiles with a first group of one or more profiles at a nominal light source intensity level and a second group of one or more profiles at a different light source intensity level;

scanning the intensity calibration test pattern to create intensity calibration test pattern image data; and calculating an intensity sensitivity value according to a ratio of a difference between a density of half swaths written at the nominal light source intensity level and a density of half swaths written at the different light source intensity level to a difference between the nominal light source intensity level and the different light source intensity level.

6. The method of claim 4, wherein each of the reflective facets of the rotating polygon of the ROS concurrently scans a swath including a plurality of scan lines across the test page or the photoreceptor in the fast scan direction, wherein the ROS overwrites at least a portion of a previous swath scanned using one reflective facet with a subsequent swath using a different reflective facet, and wherein the plurality of fiducial markings identify a particular set of scanlines in the process direction which can be correlated with a pair of overwritten swaths corresponding to two reflective facets of the ROS.

7. The method of claim 6, further comprising performing a phase calibration to identify a phase difference where a measured density variation at a fundamental or harmonic of the polygon is compensated by an applied exposure variation of the same frequency prior to creating the banding compensation test pattern.

8. The method of claim 1, further comprising performing an intensity calibration to correlate changes in intensity of the at least one light source with changes in print density prior to creating the banding compensation test pattern.

9. The method of claim 8, wherein performing the intensity calibration comprises:

creating an intensity calibration test pattern on a test page or on the photoreceptor using the printer or the marking station and a plurality of facet-specific intensity calibration profiles with a first group of one or more profiles at a nominal light source intensity level and a second group of one or more profiles at a different light source intensity level;

scanning the intensity calibration test pattern to create intensity calibration test pattern image data; and calculating an intensity sensitivity value according to a ratio of a difference between a density of half swaths written at the nominal light source intensity level and a density of half swaths written at the different light source intensity level to a difference between the nominal light source intensity level and the different light source intensity level.

10. The method of claim 8, wherein each of the reflective facets of the rotating polygon of the ROS concurrently scans a swath including a plurality of scan lines across the test page or the photoreceptor in the fast scan direction, wherein the ROS overwrites at least a portion of a previous swath scanned using one reflective facet with a subsequent swath using a different reflective facet, and wherein the plurality of fiducial markings identify a particular set of scanlines in the process direction which can be correlated with a pair of overwritten swaths corresponding to two reflective facets of the ROS.

11. The method of claim 10, further comprising performing a phase calibration to identify a phase difference where a measured density variation at a fundamental or harmonic of the polygon is compensated by an applied exposure variation of the same frequency prior to creating the banding compensation test pattern.

12. The method of claim 1, wherein each of the reflective facets of the rotating polygon of the ROS concurrently scans a swath including a plurality of scan lines across the test page or the photoreceptor in the fast scan direction, wherein the ROS overwrites at least a portion of a previous swath scanned using one reflective facet with a subsequent swath using a different reflective facet, and wherein the plurality of fiducial markings identify a particular set of scanlines in the process direction which can be correlated with a pair of overwritten swaths corresponding to two reflective facets of the ROS.

13. A document processing system, comprising:

at least one marking station operative to create a banding compensation test pattern on a test page or a photoreceptor according to a digital test pattern using a raster output scanner (ROS) having a rotating polygon with a plurality of reflective facets and at least one light source directing light toward the rotating polygon with an intensity controlled during scanning using a given one of the plurality of reflective facets according to a corresponding one of a plurality of facet-specific banding correction profiles, the banding compensation test pattern comprising a plurality of strips individually extending along a process direction and spaced from one another along a fast scan direction generally perpendicular to the process direction, where at least one of the strips includes a plurality of fiducial markings spaced from one another in the process direction to identify particular scanlines in the digital test pattern;

at least one sensor or scanner operative to scan the banding compensation test pattern to create banding compensation test pattern image data; and at least one processor operative to analyze the banding compensation test pattern image data to determine facet-specific banding errors corresponding to individual strips of the banding compensation test pattern, and to selectively adjust at least one of the plurality of facet-specific banding correction profiles to at least partially counteract the determined facet-specific banding errors.

14. The document processing system of claim 13, wherein the at least one processor is operative to perform a spatial calibration to correlate indices of a table of the facet-specific banding correction profiles to locations on the test page or the photoreceptor in the fast scan direction prior to creation of the banding compensation test pattern.

15. The document processing system of claim 13, wherein the at least one processor is operative to perform an intensity calibration to correlate changes in intensity of the at least one light source with changes in print density prior to creation of the banding compensation test pattern.

16. The document processing system of claim 15, wherein the at least one processor is operative to perform a phase calibration to identify a phase difference where a measured density variation at a fundamental or harmonic of the polygon is compensated by an applied exposure variation of the same frequency prior to creation of the banding compensation test pattern.

17. The document processing system of claim 13, wherein each of the reflective facets of the rotating polygon of the ROS concurrently scans a swath including a plurality of scan lines across the test page or the photoreceptor in the fast scan direction, wherein the ROS overwrites at least a portion of a previous swath scanned using one reflective facet with a subsequent swath using a different reflective facet, and wherein the plurality of fiducial markings identify a particular set of scanlines in the process direction which can be correlated with a pair of overwritten swaths corresponding to two reflective facets of the ROS.

18. A non-transitory computer readable medium with computer executable instructions for:

creating a banding compensation test pattern on a test page or a photoreceptor according to a digital test pattern using a printer or a marking station with a raster output scanner (ROS) having a rotating polygon with a plurality of reflective facets and at least one light source directing light toward the rotating polygon with an intensity controlled during scanning using a given one of the plurality of reflective facets according to a corresponding one of a plurality of facet-specific banding correction profiles, the banding compensation test pattern comprising a plurality of strips individually extending along a process direction and spaced from one another along a fast scan direction generally perpendicular to the process direction, where at least one of the strips includes a plurality of fiducial markings spaced from one another in the process direction to identify particular scanlines in the digital test pattern;

scanning the banding compensation test pattern to create banding compensation test pattern image data;

analyzing the banding compensation test pattern image data to determine facet-specific banding errors corresponding to individual strips of the banding compensation test pattern; and selectively adjusting at least one of the plurality of facet-specific banding correction profiles to at least partially counteract the determined facet-specific banding errors.

19. The non-transitory computer readable medium of claim 18, comprising computer executable instructions for performing a spatial calibration to correlate indices of a table of the facet-specific banding correction profiles to locations on the test page or the photoreceptor in the fast scan direction prior to creating the banding compensation test pattern.

20. The non-transitory computer readable medium of claim 18, comprising computer executable instructions for performing an intensity calibration to correlate changes in intensity of the at least one light source with changes in print density prior to creating the banding compensation test pattern.

21. The non-transitory computer readable medium of claim 20, comprising computer executable instructions for performing a phase calibration to identify a phase difference where a measured density variation at a fundamental or harmonic of the polygon is compensated by an applied exposure variation of the same frequency prior to creating the banding compensation test pattern.

* * * * *